US010148908B2

(12) United States Patent
Odamaki et al.

(10) Patent No.: US 10,148,908 B2
(45) Date of Patent: Dec. 4, 2018

(54) SYSTEMS, METHODS, AND MEDIA FOR MODULAR CAMERAS

(71) Applicants: Makoto Odamaki, West New York, NJ (US); Shree K. Nayar, New York, NY (US)

(72) Inventors: Makoto Odamaki, West New York, NJ (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/548,339

(22) PCT Filed: Feb. 19, 2016

(86) PCT No.: PCT/US2016/018779

§ 371 (c)(1),
(2) Date: Aug. 2, 2017

(87) PCT Pub. No.: WO2016/134318

PCT Pub. Date: Aug. 25, 2016

(65) Prior Publication Data

US 2018/0054595 A1 Feb. 22, 2018

Related U.S. Application Data

(60) Provisional application No. 62/118,442, filed on Feb. 19, 2015.

(51) Int. Cl.

| | |
|---|---|
| ***H04N 7/10*** | (2006.01) |
| ***G03B 17/04*** | (2006.01) |

(Continued)

(52) U.S. Cl.

CPC ............ *H04N 7/102* (2013.01); *G03B 11/00* (2013.01); *G03B 15/041* (2013.01); *G03B 17/04* (2013.01);

(Continued)

(58) Field of Classification Search

CPC ...................................................... H04N 7/102

See application file for complete search history.

(56) References Cited

U.S. PATENT DOCUMENTS

| | | | |
|---|---|---|---|
| 6,029,013 | A | 2/2000 | Larkin et al. |
| 6,356,308 | B1 | 3/2002 | Hovanky |

(Continued)

FOREIGN PATENT DOCUMENTS

| | | |
|---|---|---|
| EP | 2645164 | 10/2013 |
| WO | WO 2013162711 | 10/2013 |

OTHER PUBLICATIONS

International Preliminary Report on Patentability dated Aug. 22, 2017 in International Application No. PCT/US2016/018779.

(Continued)

*Primary Examiner* — Cynthia Segura

(74) *Attorney, Agent, or Firm* — Byrne Poh LLP

(57) ABSTRACT

Systems, methods and media for providing modular cameras are provided. In some embodiments, a modular imaging device is provided, comprising: a base module comprising: a user device interface configured to receive signals from a user device; a first magnet; a first plurality of electrical contacts; and one or more circuits that are configured to receive information transmitted to the base module from the user device via the user device interface; and an image sensor module comprising: a second plurality of electrical contacts; a second magnet; a third plurality of electrical contacts; an image sensor; and one or more circuits that are configured to: receive a first control signal; cause the image (Continued)

sensor to capture image data; and transmit the captured image data.

16 Claims, 27 Drawing Sheets

(51) Int. Cl.

| | |
|---|---|
| ***G03B 17/14*** | (2006.01) |
| ***G03B 17/56*** | (2006.01) |
| ***H04N 5/232*** | (2006.01) |
| ***G03B 11/00*** | (2006.01) |
| ***G03B 15/04*** | (2006.01) |
| ***H04N 5/225*** | (2006.01) |
| *G03B 17/48* | (2006.01) |
| *G03B 29/00* | (2006.01) |

(52) U.S. Cl.

CPC ........... *G03B 17/14* (2013.01); *G03B 17/561* (2013.01); *H04N 5/2253* (2013.01); *H04N 5/2254* (2013.01); *H04N 5/2256* (2013.01); *H04N 5/232* (2013.01); *H04N 5/23203* (2013.01); *H04N 5/23241* (2013.01); *G03B 17/48* (2013.01); *G03B 29/00* (2013.01); *G03B 2217/002* (2013.01); *G03B 2217/007* (2013.01)

(56) References Cited

U.S. PATENT DOCUMENTS 7,322,863 B2 1/2008 Rapp
7,327,396 B2 * 2/2008 Schultz .................. H04N 5/225 348/207.1
8,041,201 B2 10/2011 Eromaki et al.
8,525,924 B2 9/2013 Jannard
8,525,925 B2 * 9/2013 Jannard ................ H04N 5/2252 348/373
9,785,487 B1 * 10/2017 Liu ....................... G06F 1/1632
2004/0198101 A1 * 10/2004 Rapp .................... H04N 5/2251 439/701
2004/0198439 A1 * 10/2004 Kim ...................... H04M 1/021 455/556.1
2009/0316038 A1 * 12/2009 Schmack ............. H04N 5/2251 348/373
2010/0165188 A1 * 7/2010 Jannard ................ H04N 5/2252 348/375
2014/0368607 A1 12/2014 Krishnan et al.
2017/0171371 A1 * 6/2017 Jannard ............... H04M 1/0264
2018/0188474 A1 * 7/2018 Enta ......................... G02B 7/04

OTHER PUBLICATIONS

International Search Report and Written Opinion dated Jun. 10, 2016 in International Patent Application No. PCT/US2016/018779.

Nayar, S.K., "Computational Cameras: Approaches, Benefits and Limits", Technical Report No. CUCS-001-11, Department of Computer Science, Columbia University, Jan. 2011, pp. 1-22.

Nomura et al., "Scene Collages and Flexible Camera Arrays", in Eurographics Symposium on Rendering, Aire-la-Ville, CH, Jun. 25-27, 2007, pp. 127-138.

Zhou et al., "What are Good Aperatures for Defocus Deblurring?", in the Proceedings of the IEEE International Conference on Computational Photography, San Francisco, CA, US, Apr. 16-17, 2009, pp. 1-8.

Zhou et al., "Computational Cameras: Convergence of Optics and Processing", in IEEE Transactions of Image Processing, vol. 20, No. 12, Dec. 2011, pp. 3322-3340.

* cited by examiner

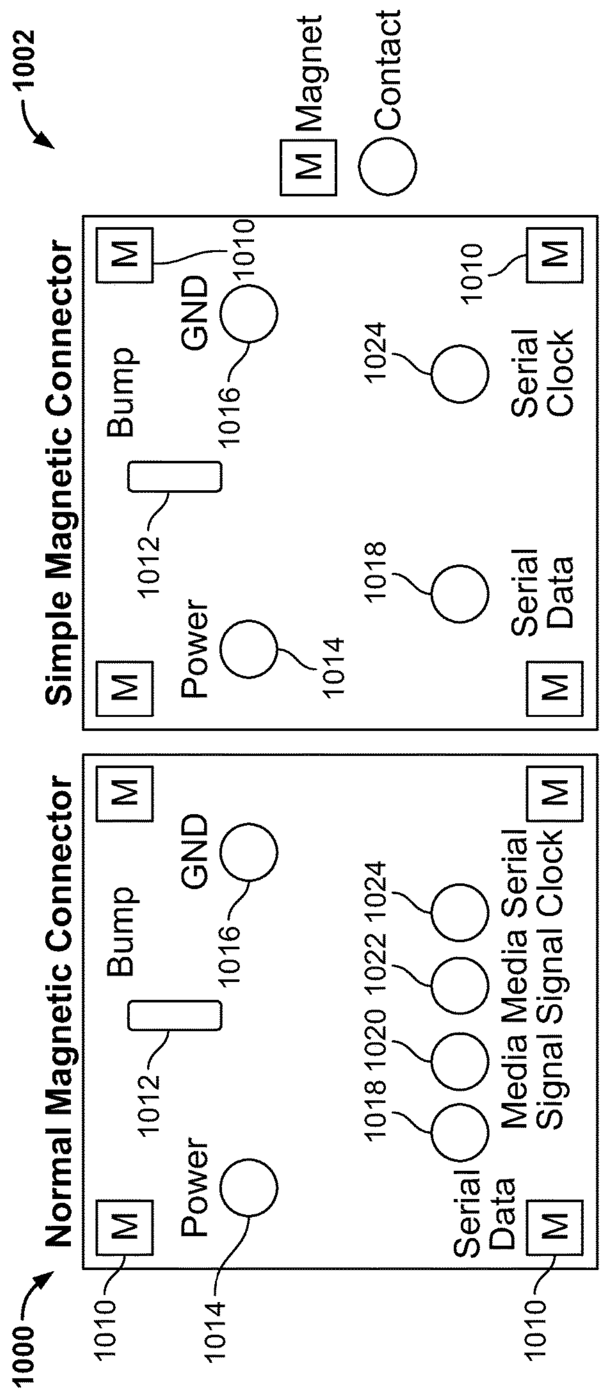
FIG. 10A
FIG. 10B
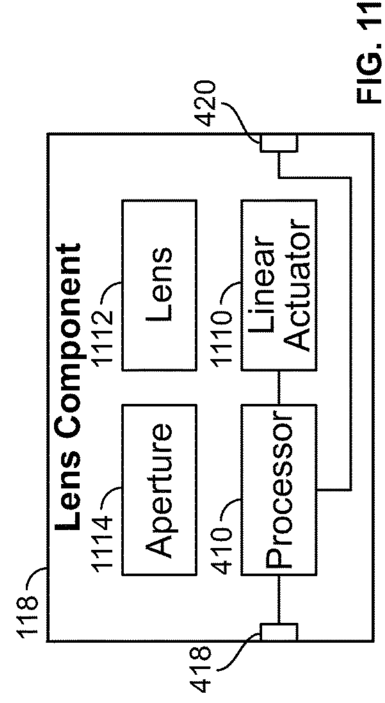
FIG. 11

SYSTEMS, METHODS, AND MEDIA FOR MODULAR CAMERAS

CROSS REFERENCE TO RELATED APPLICATION

This application claims the benefit of U.S. Provisional Patent Application No. 62/118,442, filed Feb. 19, 2015, which is hereby incorporated by reference herein in its entirety.

BACKGROUND

Although various types of camera devices are widely available, the extent to which each type of camera device can be reconfigured is generally limited to interchangeable lenses. As a result, if a user wanted to capture images in different situations, the user would need to own different cameras, or use their one camera in situations for which it is not ideal. This can lead to users becoming frustrated at the expense of buying many different cameras, or frustrated by the low quality of images captured by a camera not suited to the situation.

Accordingly, systems, methods and media for providing modular cameras are provided.

SUMMARY

Systems, methods and media for modular cameras are provided. In accordance with some embodiments of the disclosed subject matter, a modular imaging device is provided, comprising: a base module comprising: a user device interface disposed on a first side of the base module, the user device interface configured to receive signals from a user device; a first magnet disposed proximate to a surface of a second side of the base module; a first plurality of electrical contacts disposed on the second side of the base module; and one or more circuits that are configured to: receive information transmitted to the base module from the user device via the user device interface; transmit one or more control signals based on the information received from the user device to control one or more modules coupled to the base module via at least a first electrical contact of the first plurality of electrical contacts; and receive image data via at least a second electrical contact of the first plurality of electrical contacts; and transmit the received image data to the user device via the user device interface; and an image sensor module comprising: a second plurality of electrical contacts disposed on a first side of the image sensor module, wherein each electrical contact of the second plurality of electrical contacts is arranged such that it contacts a corresponding electrical contact of the first plurality of electrical contacts when the first side of the image sensor module and the second side of the base module are in contact with one another in a particular orientation; a second magnet disposed proximate to a surface of the first side of the image sensor module, wherein the second magnet is arranged such that when the first side of the image sensor module is brought into proximity of the second side of the base module in the particular orientation the second magnet is attracted to the first magnet; a third plurality of electrical contacts disposed on a second side of the image sensor module; an image sensor; and one or more circuits that are configured to: receive a first control signal via at least a first electrical contact of the second plurality of electrical contacts, wherein the first control signal is a signal indicating that the image sensor is to capture image data; determine that the first control signal is a control signal for the image sensor module and that the first control signal indicates that the image sensor is to capture image data; in response to the first control signal, cause the image sensor to capture image data; transmit the captured image data using at least a second electrical contact of the second plurality of electrical contacts that corresponds to the second electrical contact of the first plurality of electrical contacts; receive a second control signal via at least the first electrical contact of the second plurality of electrical contacts, wherein the second control signal indicates that it is for a module other than the image sensor module; and transmit the second control signal via at least a first electrical contact of the third plurality of electrical contacts.

In some embodiments, the image sensor module further comprises a third magnet disposed proximate to a surface of the second side of the image sensor module, the modular imaging device further comprising: a lens module comprising: a fourth plurality of electrical contacts disposed on a first side of the lens module, wherein each electrical contact of the fourth plurality of electrical contacts is arranged such that it contacts a corresponding contact of the third plurality of electrical contacts when the first side of the lens module and the second side of the image sensor module are in contact with one another in a particular orientation; a fourth magnet disposed proximate to a surface of the first side of the lens module, wherein the fourth magnet is arranged such that when the first side of the lens module is brought into proximity of the second side of the image sensor module in the particular orientation the fourth magnet is attracted to the third magnet; a lens; one or more circuits that are configured to: transmit information identifying the type of lens included in the lens module using at least a first electrical contact of the fourth plurality of electrical contacts that corresponds to the first electrical contact of the third plurality of electrical contacts; and wherein the one or more circuits of the sensor module are further configured to: receive the information identifying the type of lens included in the lens module using at least the first electrical contact of the third plurality of electrical contacts; and transmit the information identifying the type of lens included in the lens module using at least the first electrical contact of the second plurality of electrical contacts.

In some embodiments, the image sensor module further comprises a second lens module that can be used interchangeably with the lens module, the second lens module comprising: a fifth plurality of electrical contacts disposed on a first side of the second lens module, wherein each electrical contact of the fifth plurality of electrical contacts is arranged such that it contacts a corresponding contact of the third plurality of electrical contacts when the first side of the second lens module and the second side of the image sensor module are in contact with one another in a particular orientation; a fifth magnet disposed proximate to a surface of the first side of the second lens module, wherein the fifth magnet is arranged such that when the first side of the second lens module is brought into proximity of the second side of the image sensor module in the particular orientation the fifth magnet is attracted to the third magnet; a second lens; an actuator; one or more circuits that are configured to: receive the second control signal via at least the first electrical contact of the fifth plurality of electrical contacts, wherein the second control signal is a signal indicating that the second lens module is to move the second lens using the actuator; determine that the second control signal is a control signal for the second lens module and that the second control signal indicates that the actuator is to be driven to move the second lens; and in response to the second control signal, cause the actuator to be activated based on the second control signal.

In some embodiments, the lens module further comprises a sixth magnet disposed proximate to a surface of a second side of the lens module, the modular imaging device further comprising: an optical component comprising: a seventh magnet disposed proximate to a surface of a first side of the optical component, wherein the seventh magnet is arranged such that when the first side of the optical component is brought into proximity of the second side of the lens module in a particular orientation the seventh magnet is attracted to the sixth magnet; and an optical filter through which light from a scene passes such that when the first side of the optical component is in contact with the second side of the lens module in the particular orientation, the light passing through the optical filter is received by the lens of the lens module.

In some embodiments, the modular imaging device further comprises a rotational actuator module comprising: a sixth plurality of electrical contacts disposed on a first side of the rotational actuator module, wherein each electrical contact of the sixth plurality of electrical contacts is arranged such that it contacts a corresponding contact of the first plurality of electrical contacts when the first side of the rotational actuator module and the second side of the base module are in contact with one another in a particular orientation; an eighth magnet disposed proximate to a surface of the first side of the rotational actuator module, wherein the sixth magnet is arranged such that when the first side of the rotational actuator module is brought into proximity of the second side of the base module in the particular orientation the eighth magnet is attracted to the first magnet; a seventh plurality of electrical contacts disposed on a second side of the rotational actuator module, wherein each electrical contact of the seventh plurality of electrical contacts is arranged such that it contacts a corresponding contact of the second plurality of electrical contacts when the second side of the rotational actuator module and the first side of the image sensor module are in contact with one another in a particular orientation; a ninth magnet disposed proximate to a surface of the second side of the rotational actuator module, wherein the seventh magnet is arranged such that when the second side of the rotational actuator module is brought into proximity of the first side of the image sensor module in the particular orientation the ninth magnet is attracted to the second magnet; a first housing including the first side of the rotational actuator module; a second housing including the second side of the rotational actuator module; a rotational actuator configured to rotate the second housing with respect to the first housing based on a control signal; and one or more circuits that are configured to: receive the second control signal via at least the first electrical contact of the sixth plurality of electrical contacts, wherein the second control signal indicates that it is for a module other than the rotational actuator module; transmit the second control signal via at least a first electrical contact of the seventh plurality of electrical contacts; receive a third control signal via at least the first electrical contact of the sixth plurality of electrical contacts, wherein the third control signal is a signal indicating that the second housing is to be rotated relative to the first housing using the rotational actuator; determine that the third control signal is a control signal for the rotational actuator module and that the third control signal indicates that the second housing is to be rotated relative to the first housing using the rotational actuator; and in response to the third control signal, cause the rotational actuator to be activated based on the third control signal.

In some embodiments, the image sensor module further comprises an eighth plurality of electrical contacts disposed on a third side of the image sensor module and a tenth magnet disposed proximate to the third side of the image sensor module, the modular imaging device further comprising: a strobe module comprising: a ninth plurality of electrical contacts disposed on a first side of the strobe module, wherein each electrical contact of the ninth plurality of electrical contacts is arranged such that it contacts a corresponding contact of the eighth plurality of electrical contacts when the first side of the strobe module and the third side of the image sensor module are in contact with one another in a particular orientation; an eleventh magnet disposed proximate to a surface of the first side of the strobe module, wherein the ninth magnet is arranged such that when the first side of the strobe module is brought into proximity of the third side of the image sensor module in the particular orientation the eleventh magnet is attracted to the ninth magnet; at least one light source; and one or more circuits that are configured to: receive a fourth control signal via at least the first electrical contact of the ninth plurality of electrical contacts, wherein the fourth control signal is a signal indicating that the strobe module is to activate the at least one light source; determine that the fourth control signal is a control signal for the strobe module and that the fourth control signal indicates that the at least one light source is to be activated; and in response to the fourth control signal, activate the light source.

In some embodiments, the base module receives power from the user device via a voltage received on the user device interface and supplies the received voltage using a third electrical contact of the first plurality of electrical contacts.

In some embodiments, the base module further comprises a tenth plurality of electrical contacts disposed on a third side of the base module and a twelfth magnet disposed proximate to the third side of the base module, the modular imaging device further comprising: a power module comprising: a least one electrical contacts disposed on a first side of the power module, wherein the at least one electrical contact of the eleventh plurality of electrical contacts is arranged such that it contacts a corresponding contact of the tenth plurality of electrical contacts when the first side of the power module and the third side of the base module are in contact with one another in a particular orientation; a thirteenth magnet disposed proximate to a surface of the first side of the power module, wherein the thirteenth magnet is arranged such that when the first side of the power module is brought into proximity of the third side of the base module in the particular orientation the thirteenth magnet is attracted to the twelfth magnet; and at least one power source, wherein the power module is configured to supply a voltage to the at least one electrical contact to provide power to the base module.

In some embodiments, the one or more circuits of the image sensor are further configured to process the captured image data prior to transmitting the captured image data using at least the second electrical contact of the second plurality of electrical contacts.

In some embodiments, the base module further comprises: a fourteenth magnet disposed proximate to a surface of the second side of the base module; an eleventh plurality of electrical contacts disposed on the second side of the base module; and wherein the one or more circuits of the base module are further configured to: transmit the one or more control signals based on the information received from the user device to control one or more modules coupled to the base module via at least a first electrical contact of the eleventh plurality of electrical contacts; and receive second image data via at least a second electrical contact of the eleventh plurality of electrical contacts; and transmit the received second image data to the user device via the user device interface; and wherein the module imaging device further comprises: a second image sensor module comprising: a twelfth plurality of electrical contacts disposed on a first side of the second image sensor module, wherein each electrical contact of the twelfth plurality of electrical contacts is arranged such that it contacts a corresponding electrical contact of the eleventh plurality of electrical contacts when the first side of the second image sensor module and the second side of the base module are in contact with one another in a particular orientation; a fifteenth magnet disposed proximate to a surface of the first side of the image sensor module, wherein the second magnet is arranged such that when the first side of the image sensor module is brought into proximity of the second side of the base module in the particular orientation the second magnet is attracted to the first magnet; a second image sensor; and one or more circuits that are configured to: receive a fifth control signal via at least a first electrical contact of the twelfth plurality of electrical contacts, wherein the first control signal is a signal indicating that the second image sensor is to capture image data; determine that the fifth control signal is a control signal for the second image sensor module and that the fifth control signal indicates that the image sensor is to capture image data; in response to the fifth control signal, cause the second image sensor to capture second image data; and transmit the captured second image data using at least a second electrical contact of the twelfth plurality of electrical contacts that corresponds to the second electrical contact of the eleventh plurality of electrical contacts.

In some embodiments, the one or more circuits of the image sensor module are further configured to: transmit identifying information of the image sensor module using the first electrical contact of the second plurality of electrical contacts; receive identifying information of a module connected to the second side of the image sensor module using the first electrical contact of the third plurality of electrical contacts; and transmit the identifying information of the module connected to the second side of the image sensor with information indicating that the module is connected to the second side of the image sensor using the first electrical contact of the second plurality of electrical contacts.

In some embodiments, the one or more circuits of the base module include a hardware processor and a hub, wherein the hardware processor transmits the control signals, and wherein the hub receives the image data and transmits the received image data to the user device via the user device interface.

In some embodiments, the one or more circuits of the image sensor module include a hardware processor.

In some embodiments, the user device interface comprises a universal serial bus (USB) interface.

In some embodiments, the first plurality of electrical contacts each comprise a pin that is biased toward the outside of the base module by a spring.

In some embodiments, the second plurality of electrical contacts each comprise a contact pad disposed within a body of the image sensor module.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 10A and 10B each shows an example of a magnetic connector in accordance with some embodiments of the disclosed subject matter.

FIG. 11 shows an example of a lens component in accordance with some embodiments of the disclosed subject matter.

DETAILED DESCRIPTION

Systems, methods, and media for modular cameras are disclosed herein.

In accordance with some embodiments, mechanisms (which can include systems, methods, and media) for implementing modular cameras with interchangeable modular components is disclosed. In some embodiments, different modular components can serve different functions. Thus, different configurations of the modular components can be used to capture different types of images and/or video. For example, a modular camera can include two modular components having image sensors (sometimes referred to herein as sensor components) and two modular components having photo lenses (sometimes referred to herein as lens components). Such a modular camera can capture two images at once, at different angles, and using different lenses. These two images can be used to create a stereoscopic image, a depth map, a collage, or any other suitable image. As another example, a modular camera can include a sensor component and a modular component having an actuator capable of rotating the modular component. In such an example, the actuator component can be attached to the sensor component such that when the actuator component moves, the sensor component moves, thus allowing the sensor component to change its field of view and/or pan.

In some embodiments, the modular camera can include a user device which can be configured to control various functions of the modular camera system, generate computational images, display captured images to a user, and/or perform any other suitable function. For example, the user device can be configured to cause image sensors in the modular camera to capture images, cause lenses to be moved or switched (e.g., in order to change the depth of focus), and/or cause an actuator to move (e.g., in order to cause an attached sensor component to move). The user device can also receive the images captured and process the images using any suitable image processing techniques, such as stitching, refocusing, collaging, creating high dynamic range images, and/or any other suitable image processing technique.

In some embodiments, the modular components can each include one or more magnetic connectors that facilitate the modular components to be attached to and detached from each other, thereby facilitating a user to modify the configuration of the modular camera at any time. In some embodiments, the magnetic connectors can include electrical contacts configured to facilitate communication between the modular components. The signals can be passed from one modular component to the next until reaching the modular component that the signals are directed to.

Figure 1:
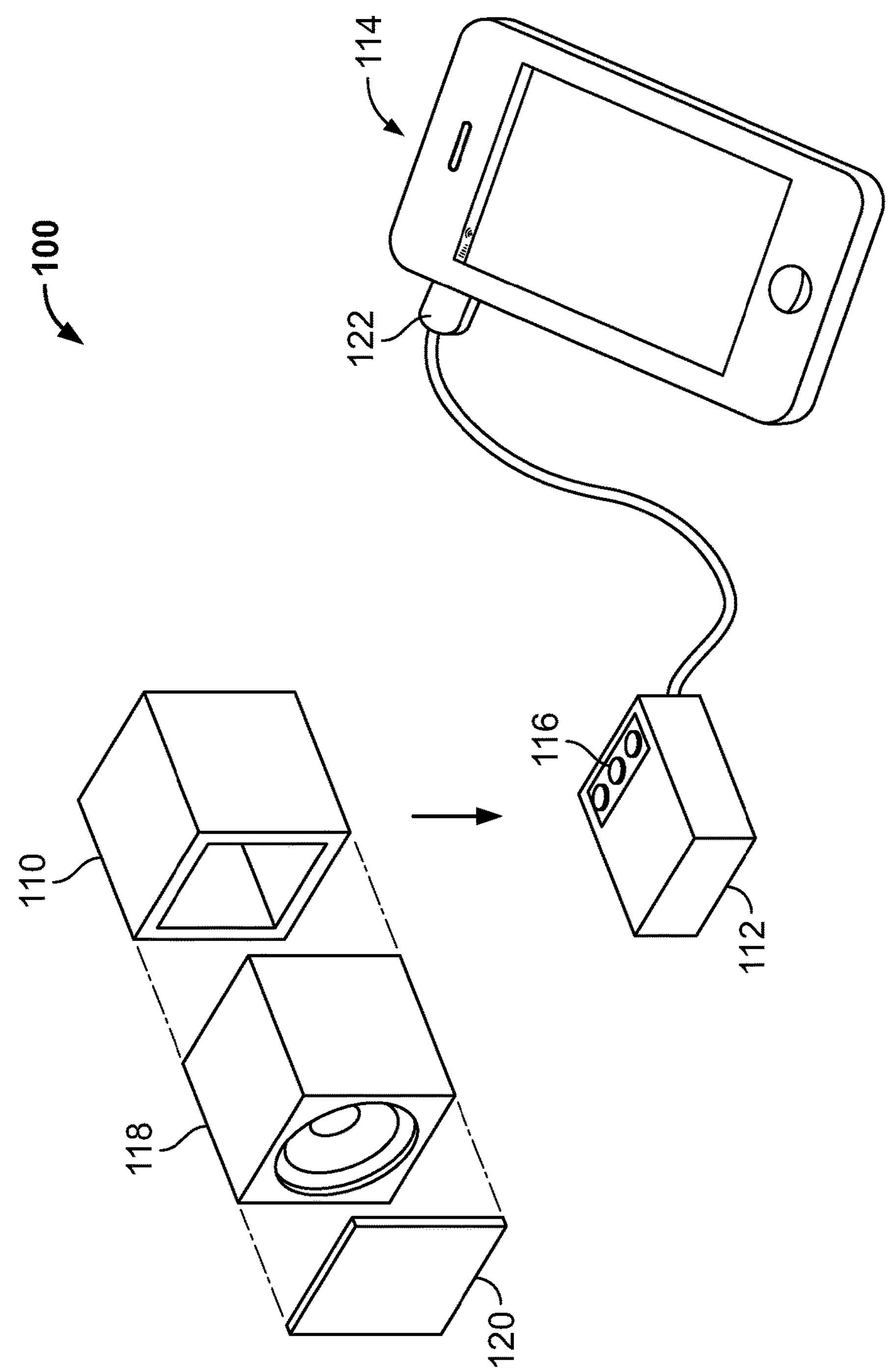
FIG. 1 shows an example of a modular camera system in accordance with some embodiments of the disclosed subject matter.

Turning to FIG. 1, an example 100 of a modular camera system, in accordance with some embodiments of the disclosed subject matter, is illustrated. As shown in FIG. 1, a modular camera system 100 can include several modular components, such as a sensor component 110, a lens component 118, a base component 112, an optical component 120, a wire connector 122, and a user device 114, in some embodiments.

In some embodiments, sensor component 110, lens component 118, base component 112, optical component 120, and user device 114 can be coupled to form a modular camera system that can be controlled by a user through user device 114. For example, when user device 114 is coupled to base component 112 and sensor component 110, user device 114 can cause sensor component 110 to capture one or more images, and communicate the one or more images through base component 112 to user device 114, where the image can be displayed and/or manipulated. To continue the example, in some embodiments, optical component 120 can be attached to lens component 118, which can be attached to sensor component 110 in order to modify the light that is captured by sensor component 110.

In some embodiments, one or more modular components of modular camera system 100 can have a shape and structure configured to facilitate attachment to, and detachment from, other components without requiring the use of tools. For example, the modular component can be rigid, and have a size and shape suitable for retaining all of the modular component's parts in a functional position (e.g., a position allowing the modular component to function upon attachment to the modular camera system). A modular component can include magnets disposed near its exterior, so that it can be attached to or detached from another modular component with similarly equipped magnets without requiring any of the modular component's parts to be rearranged, detached, or otherwise manipulated. As a more particular example, lens component 118, which retains one or more lenses within the confines of a substantially cubical shape, can remain in a functional position (e.g., with its lens directed outward) when lens component 118 is detached from other components.

In some embodiments, one or more modular components of modular camera system 100 can each include one or more connectors configured such that each modular component, when attached to one or more other modular components, can establish electrical connection(s) with the one or more other modular components to transmit power, data, programs, signals (e.g., control signals), etc. For example, in some embodiments, one or more magnetic connectors 116 (e.g., as described below in connection with FIG. 9) can be positioned near an outer surface of a modular component such that when the modular component is suitably positioned adjacent to another modular component having a complementary magnetic connector 116 positioned near its outer surface, the magnetic connectors can connect, and form a mechanical connection and an electrical connection between the modular components.

In some embodiments, two or more modular components of the modular camera system can have shapes configured to facilitate the two or more modular components to make substantially flush surface contact. For example, as illustrated with sensor component 110, lens component 118, and base component 112, a modular component can have a substantially box-like shape (e.g., a cubical shape or a rectangular prism shape), such that at least a portion of one or more of its sides has a substantially flat surface that can make substantially flush contact with the one or more sides of another substantially box-like modular component. As another example, at least a portion of one or more sides of a modular component can have a concave curvature, such that the portion can make substantially flush contact with at least a portion of another modular component having one or more convex sides.

In some embodiments, user device 114 can be implemented as any computing device suitable for receiving user input, storing images, communicating instructions to modular components, and/or performing any other suitable functions. For example, user device 114 can be a desktop computer, a laptop computer, a mobile phone, a tablet computer, a wearable computer, and/or any other suitable computing device.

In some embodiments, sensor component 110 can be implemented using any suitable image sensor. For example, sensor component 110 can be a sensor component as described below in connection with FIG. 8.

In some embodiments, lens component 118 can be implemented using any suitable lens or combination of lenses. For example, lens component 118 can be a lens component as described below in reference to FIG. 11. In some embodiments, lens component 118 can be omitted. Additionally or alternatively, in some embodiments, lens component 118 can be implemented as part of sensor component 110. For example, sensor component 110 can include one or more lenses positioned adjacent to its image sensor such as to allow the image sensor to capture images using the one or more lenses.

In some embodiments, optical component 120 can be implemented using any suitable modular components that, when connected (directly or indirectly) with a sensor component, alter the pattern and/or frequencies of light passed to sensor component 110. In some embodiments, optical component 120 can be omitted. For example, optical component 120 can be a polarization filter, a spectral filter, a scratch filter, a diffuser, a kaleidoscope, a teleidoscope, any other suitable optical attachments, and/or any suitable combination thereof.

In some embodiments, magnetic connector 116 can be implemented using any suitable arrangement of magnets and/or contacts to mechanically attach two modular components using magnetic force and electrically connect the modules to facilitate the communication of power and/or signals. For example, magnetic connector 116 can be implemented as magnetic connector 1000 and/or magnetic connector 1002 as described below in connection with FIG. 10.

In some embodiments, rather than establish both a mechanical connection and an electrical connection with another module (e.g., as described below in connection with FIG. 9), magnetic connector 116 can omit the contacts for providing the electrical connection, and provide only a mechanical connection.

Additionally or alternatively, in some embodiments, in place of magnetic connector 116, any connector and/or fastener suitable for allowing a user to attach and detach two modular components without requiring substantial alteration of either modular component, and/or without requiring the use of a tool, can be used. For example, hook and loop fasteners, snap fasteners, latch and clip fasteners, draw latches, tension latches, magnets, electromagnets, any other suitable connector and/or fastener, or any suitable combination thereof can be used.

In some embodiments, additionally or alternatively to making an electrical connection through physical contact, an electrical connection can be established using any suitable non-contact connection, such as a radio frequency connection, an inductive coupling, a capacitive coupling, an optical coupling, and/or any other suitable non-contact connection.

In some embodiments, user device 114 can connect to base component 112 via wired connector 122, and sensor component 110 can connect to base component 112 via magnetic connector 116. Although base component 112 and sensor component 110 are shown in FIG. 1 as being connected via a magnetic connector 116, any of the modular components of system 100 can be connected to each other via other magnetic connectors 116, and/or any other suitable connection. Similarly, although only user device 114 and base component 112 are shown connected via wired connector 122, any of the components shown can be connected via wired connector 122, and/or any other suitable connection.

In some embodiments, wired connector 122 can be implemented using any suitable techniques. For example, wired connector 122 can be implemented using a Universal Serial Bus (USB), a High-Definition Multimedia Interface (HDMI), an Ethernet, and/or any other suitable wired communication interface.

In some embodiments, additionally or alternatively to using a wired connection 122, a wireless connection can be used between a user device and a component.

Figure 2:
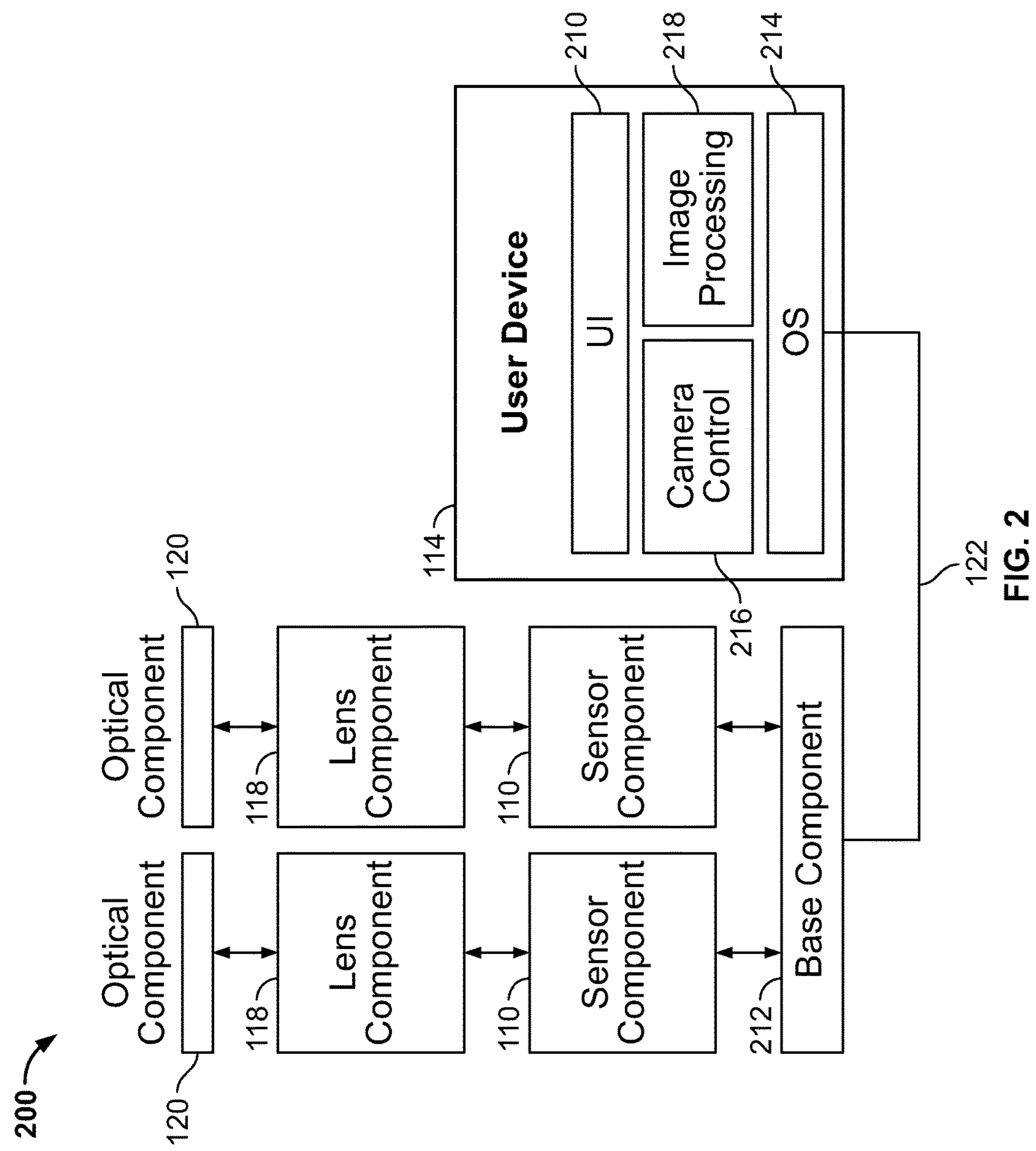
FIG. 2 shows an example of a block diagram of a modular camera system in accordance with some embodiments of the disclosed subject matter.

FIG. 2 shows an example 200 of a block diagram of a modular camera system configured with two sensor components 110, two lens components 118, and two optical components 120, in accordance with some embodiments of the disclosed subject matter.

In some embodiments, modular camera system 200 can capture two or more images simultaneously or nearly simultaneously.

In some embodiments, as shown in FIG. 2, base component 212 can connect to two sensor components 110, and each sensor component 110 can attach to a lens component 118, which can in turn, each attach to an optical component 120. Base component 212 also can be attached to user device 114, which can be configured to provide a user interface (UI) 210, an operating system (OS) 214, a camera control program 216, and an image processing program 218. In some embodiments, a user can operate user device 114 (e.g., by way of user interface 210), to cause user device 114 to transmit a signal to both sensor components 110 that causes both sensor components 110 to simultaneously, or nearly simultaneously, capture an image. Sensor component 110 can then transmit the images back to user device 114, via base component 212, where user device 114 can, for example, present the images, automatically perform any suitable image processing using image processing program 218, and/or facilitate manipulation of the image by the user via image processing program 218 and/or user interface 210, and/or perform any other suitable function.

In some embodiments, camera control program 216 can include any suitable software for providing control signals to operate sensor component 110, lens component 118, and/or any other suitable modular component (e.g., actuator component 512, as described below in connection with FIGS. 5 and 12). Additionally or alternatively, in some embodiments, camera control program 216 can be provided via firmware and/or hardware.

In some embodiments, camera control program 216 can generate and/or provide any suitable signals (e.g., control signals) and/or information related to image capture (such as image capture parameters). For example, camera control program 216 can generate and/or provide exposure time, focus depth, and/or any other suitable parameters related to image capture.

In some embodiments, the image processing program 218 can include any suitable software suitable for digitally manipulating image data received from sensor component 110. Additionally or alternatively, in some embodiments, image processing program 218 can be provided via firmware and/or hardware. In some embodiments, image processing program 218 can perform any suitable digital manipulation of image data, such as High Dynamic Range (HDR) imaging, stitching, wide angle stitching, morphing, panorama, focus stacking, stereo imaging, stereo panorama demosaicing, defect correction, color space correction, auto-exposure, auto-focusing, refocusing, automatic white balancing, scaling, image filtering, noise reduction, distortion correction, image compression, and/or any other suitable image processing functions.

In some embodiments, as illustrated in FIG. 2, base component 212 can connect with two sensor components 110 in order to implement a modular camera system capable of capturing two images simultaneously, or at different times, using any suitable technique or combination of techniques. For example, base component 212 can have two or more connectors, and have a size and shape suitable for connecting two or more sensor components concurrently.

In some embodiments, modular camera system 200 can include two or more base components 112 (as described above in connection with FIG. 1) that can connect to each other in order to implement a modular camera system capable of capturing two or more images simultaneously or at different times. For example, user device 114 can connect with a first base component 112, which can connect with a second base component 112. In such an example, each base component 112 can connect to one or more sensor components 110. Upon receiving a signal from user device 114, the first base component 112 can transmit the signal to the second base component 112. Each base component can then cause its corresponding sensor component to capture an image (e.g., simultaneously, or at different times).

In some embodiments, base component 212 can include any suitable number of connectors. For example, base component 212 can include four magnetic connectors 116. In such an example, base component 212 can connect to four sensor components 110 via the four magnetic connectors 116 such as to form a modular camera system capable of capturing four images simultaneously or at different times.

Figure 3:
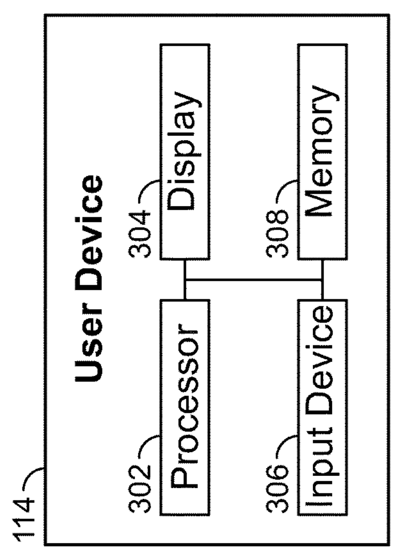
FIG. 3 shows an example of hardware for implementing a user device in accordance with some embodiments of the disclosed subject matter.

FIG. 3 shows an example of hardware for implementing a user device 114 in accordance with some embodiments of the disclosed subject matter. In some embodiments, as illustrated, user device 114 can include hardware processor 302, display 304, input device 306, and memory 308.

In some embodiments, hardware processor 302 can include any suitable hardware processor, such as a microprocessor, a micro-controller, and/or any other suitable circuit for controlling the functions of the user device and/or the modular components. In some embodiments, the hardware processor can be controlled by a program stored in memory 308, such as operating system 214, image processing function 218, any other suitable program, and/or any suitable combination thereof.

In some embodiments, memory 308 can be any suitable storage device and/or memory device. For example, the memory can include read-only memory, random-access memory, flash memory, hard disk storage, optical media, external memory (e.g., an SD card), any other suitable storage, and/or any suitable combination of storage devices.

In some embodiments, any suitable display device can be used. For example, the display device can include a touchscreen, a television, a flat-panel display, a projector, any other suitable display device, and/or any suitable combination of display devices.

Figure 4:
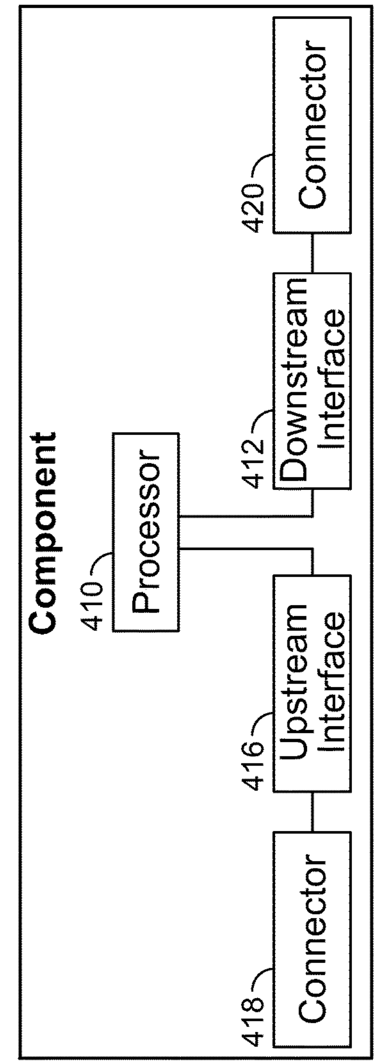
FIG. 4 shows an example of a communication system for a modular component of a modular camera system in accordance with some embodiments of the disclosed subject matter.

FIG. 4 shows an example 400 of a communication system for a modular component (e.g., base component 112, base component 212, sensor component 110, and/or any other suitable modular component) of a modular camera system (e.g., modular camera system 100 and/or modular camera system 200, as described above) in accordance with some embodiments of the disclosed subject matter. As illustrated, in some embodiments, a modular component can include a hardware processor 410 coupled with a downstream interface 412 and an upstream interface 416, and each interface can be coupled to a connector 418 and 420, respectively.

In some embodiments, connectors 418 and 420 can be implemented using any connector suitable for establishing a mechanical connection and/or an electrical connection with a corresponding connector of another modular component. For example, a magnetic connector as described below with reference to FIG. 9 and/or FIG. 10 can be used to establish a mechanical connection and/or an electrical connection. As another example, an inductive coupling can be used to establish an electrical connection. Additionally or alternatively, in some embodiments, a wireless link can be used to establish an electrical connection. More particularly, the wireless link can be implemented using a wireless communication module such as Bluetooth, WiFi, near field communication radio, and/or any other wireless communication module suitable for establishing wireless communication between two or more modular components.

In some embodiments, hardware processor can be implemented as any suitable hardware processor. For example, a hardware processor as described in connection with FIG. 3 can be utilized in some embodiments. In some embodiments, hardware processor 410 can be a micro-controller.

In some embodiments, hardware processor 410 can be configured to receive a signal from and/or transmit a signal to another modular component via connectors 418 and/or 420, downstream interface 412 and/or upstream interface 416. For example, in some embodiments, user device 114 can be connected with base component 112, which can be connected to sensor component 110. In such an example, base component 112 and sensor component 110 can each include communication system 400 and can be mechanically and/or electrically connected via connectors 418 and/or 420. User device 114 can generate and transmit a control signal that, for example, can cause sensor component 110 to capture an image, by first transmitting the control signal to base component 112. Upon receiving the control signal, base component 112 can use hardware processor 410 to determine that the control signal is directed to sensor component 110, and retransmit the control signal to sensor component 110 via downstream interface 412 and connectors 418 and/or 420.

In some embodiments, hardware processor 410 can determine whether to retransmit a signal based on a unique identifier associated with the control signal. For example, in some embodiments, each modular component can have a predetermined unique identifier, and a control signal received by the modular component can be associated with an identifier of the modular component to which the control signal is directed. In such an example, hardware processor 410 can determine whether the identifier included in the signal matches the predetermined unique identifier of the modular component receiving the control signal. Upon determining that the identifiers do not match, hardware processor 410 can retransmit the signal to one or more other modular components.

Otherwise, in some embodiments, upon determining that an identifier included in a control signal matches the unique identifier of the modular component, hardware processor 410 and/or any other suitable hardware can take any suitable action based on the signal. For example, in a case in which the modular component that receives the control signal is lens component 118 (as described above in connection with FIG. 1), and lens component 118 includes communication system 400, hardware processor 410 can receive a control signal that includes the unique identifier of lens component 118 as well as a request for the lens component to move its lens. In such an example, hardware processor 410 and/or any other suitable hardware can cause the lens to move based on the received control signal (e.g., by causing an actuator connected to the lens to move). As another example, hardware processor 410 can pass the control signal internally to another hardware processor (e.g., as described below in connection with FIG. 8).

In some embodiments, hardware processor 410 can be configured to transmit a signal to a user device (e.g., user device 114, as described above) containing any suitable information about the modular component that hardware processor 410 is operating, and/or any suitable information about any modular components that it is coupled to (e.g., via connectors 418 and/or 420, and/or via magnetic connector 116). For example, in a case in which hardware processor 410 is operating a sensor component (e.g., sensor component 110, as described above in connection with FIG. 1), which is coupled to a lens component (e.g., lens component 118, as described above in connection with FIG. 1) downstream, hardware processor 410 can transmit a signal, via upstream interface 416 and connector 418, to the user device. The signal can indicate that the modular component is a sensor component and that it is coupled to a downstream lens component. The signal can further indicate the status of the sensor component (e.g., operational or standing by), parameters of the sensor component (e.g., an exposure setting), and/or any other suitable information concerning the sensor component.

In some embodiments, downstream interface 412 and/or upstream interface 416 can be implemented as any interface suitable for transferring data via any suitable protocol. For example, a serial protocol such as Universal Serial Bus (USB), Unified Protocol (Uni Pro), Inter-Integrated Circuit ($I^2C$ or $I^3C$), Serial Peripheral Interface Bus (SPI), Universal Asynchronous Receiver/Transmitter (UART), and/or any other suitable serial protocol can be used.

In some embodiments, downstream interface 412 and upstream interface 416 can be implemented using substantially identical interfaces, and can therefore be substantially interchangeable. Similarly, in some embodiments, downstream interface 412 and upstream interface 416 can be bidirectional (i.e., capable of operating both upstream and downstream). Additionally or alternatively, in some embodiments, a single interface can be implemented as both downstream interface 412 and upstream interface 416. In such embodiments, the single interface can be coupled to two or more connectors (e.g., connectors 418 and 420).

Although only two connectors 418 and 420 are illustrated in FIG. 4, in some embodiments, communication system 400 can include one, two, three, or more connectors. Similarly, although only one each of downstream interface 412 and upstream interface 416 are shown, communication system 400 can include any suitable number of interfaces 412 and 416, (e.g., a number matching the number of connectors 418 and/or 420). For example, if communication system 400 includes four connectors, including connectors 418 and 420, it can also include three downstream interfaces 412 and one upstream interface 416. Additionally or alternatively, communication system 400 can include an upstream interface 416 and a downstream interface 412, each electrically connected to all corresponding connectors.

In some embodiments, connectors 418 and 420 can be positioned in any suitable location proximate to the exterior of a modular component that is implementing communication system 400. For example, in a case in which the modular component has a substantially cubical shape, connector 418 can be positioned on the exterior of one side of the modular component, and connector 420 can be positioned on the exterior of the opposite side of the modular component. In some embodiments, each side of a modular component can include a connector 418 and/or 420 to facilitate connection with another modular component on any suitable side.

In some embodiments, communication system 400 can be configured to retransmit signals directly from the modular component that is implementing communication system 400 to a modular component that is coupled immediately upstream and/or downstream. For example, connectors 418 and 420 can be coupled directly with each other, bypassing interfaces 412 and 416, and hardware processor 410 (e.g., as described below in connection with FIG. 14).

Figure 5:
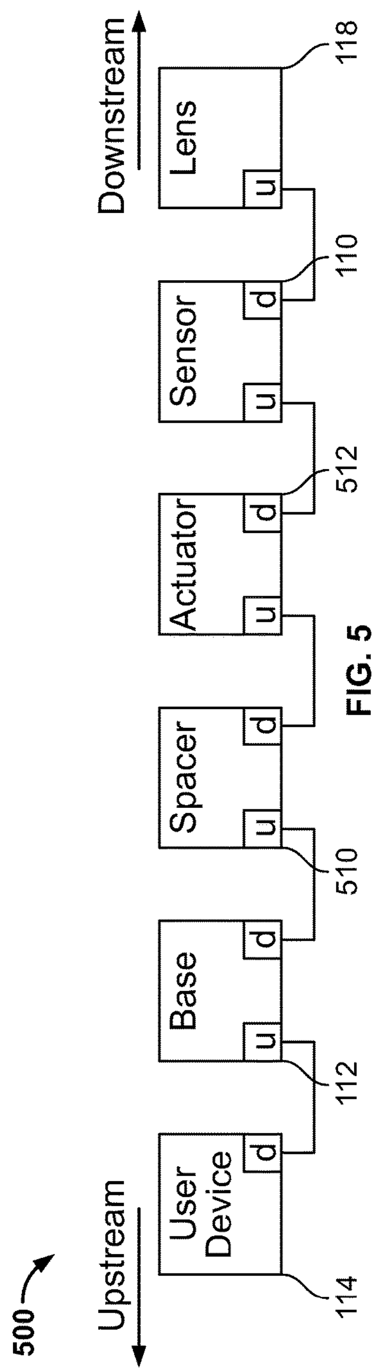
FIG. 5 shows an example of a modular camera system with coupling between the modular components in accordance with some embodiments of the disclosed subject matter.

FIG. 5 shows an example 500 of a modular camera system with coupling between the modular components in accordance with some embodiments of the disclosed subject matter. In some embodiments, as illustrated, user device 114 can be coupled to base component 112, which can be coupled to a spacer component 510, which can be coupled to an actuator component 512, which can be coupled to a sensor component 110, which can be coupled to a lens component 118. In some embodiments, communications directed toward user device 114 are labeled "upstream" and communications directed away from user device 114 are labeled "downstream." However, in some embodiments, communications can travel in any suitable direction and/or travel bidirectionally.

In some embodiments, the connections between the various devices in FIG. 5 can be implemented using any suitable technique or combination of techniques. For example, any type of connection as described above with reference to FIG. 4, and/or any suitable combination of connections can be utilized. In some embodiments, one or more of the modular components shown in FIG. 5 can include communication system 400, as described above in connection with FIG. 4.

In some embodiments, user device 114 can transmit a control signal to any modular component by initiating a communication sequence, which can begin by transmitting the control signal to a modular component that user device 114 is directly connected to. For example, in modular camera system 500, user device 114 can transmit a signal to any modular component by first transmitting the signal to base component 112. Base component 112 can then retransmit the signal to one or more next modular components, and the control signal can be retransmitted by each modular component until the control signal reaches the intended modular component. As a more particular example, user device 114 can transmit a control signal for actuator component 512 (e.g., a signal that can cause actuator component 512 to rotate) by transmitting the signal to base component 112, which can retransmit the signal to spacer component 510, which can retransmit the signal to actuator component 512.

Figure 6:
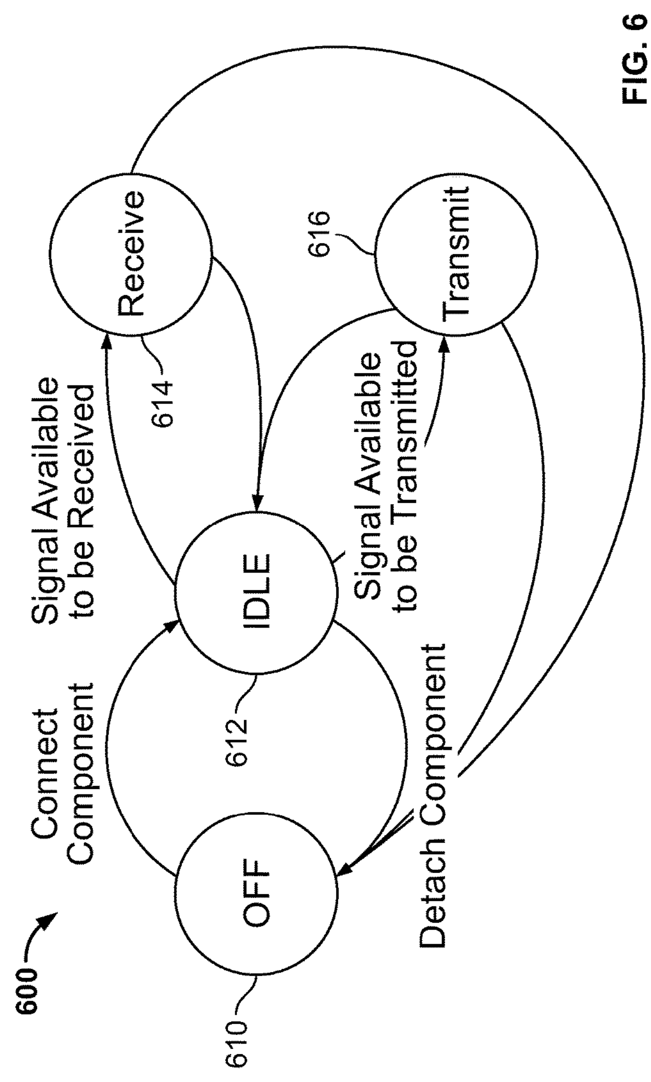
FIG. 6 shows a state machine diagram of an example for a modular component in accordance with some embodiments of the disclosed subject matter.

FIG. 6 shows a state machine diagram of an example for a modular component in accordance with some embodiments of the disclosed subject matter. As illustrated, a modular component can have an off state 610, an idle state 612, a receiving state 614, and a transmitting state 616, in some embodiments.

In some embodiments, as shown in FIG. 6, a modular component can remain in off state 610 (e.g., unpowered and/or not operational) until a connection is established with another modular component, and upon establishing a connection, enter an idle state 612 using any suitable technique, combination of techniques, and/or any suitable information. For example, a modular component can remain in off state 610 until it receives power from another modular component to which it has been connected (e.g., via power contact 1014, as described below in connection with FIG. 10).

In some embodiments, while in idle state 612, the modular component can receive power. In some embodiments, while in idle state 612, the modular component can be neither transmitting nor receiving signals. Additionally or alternatively, in some embodiments, upon entering idle state 612, a modular component can transmit a signal containing a unique identifier (e.g., a unique identifier as described above in connection with FIG. 4) to user device 114, which can identify the modular component based on the unique identifier. In such embodiments, in response to receiving the unique identifier, user device 114 can use the unique identifier when transmitting signals to the modular component, such as control signals (i.e., signals that can cause the modular component to perform a certain function).

In some embodiments, upon detecting that a signal is ready to be received, a modular component can enter receiving state 614. While in receiving state 614, a modular component can, for example, receive signals from an upstream and/or downstream modular component.

In some embodiments, upon detecting that a signal is ready to be transmitted, a modular component can enter transmitting state 616. While in transmitting state 616, a modular component can, for example, retransmit signals received to an upstream and/or downstream modular component.

In some embodiments, a modular component can be in receiving state 614 and in transmitting state 616 simultaneously.

Figure 7:
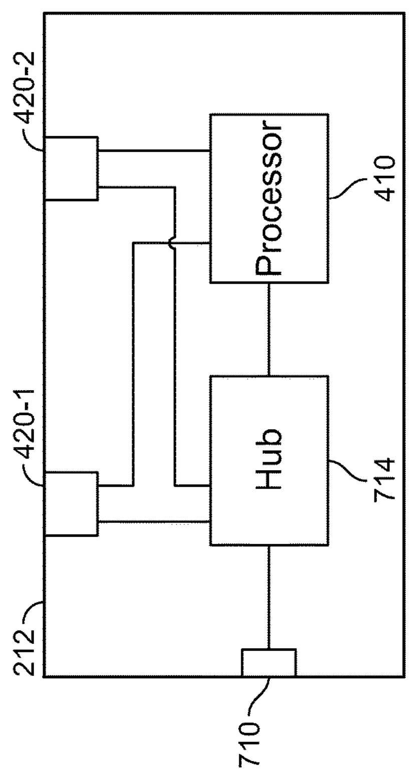
FIG. 7 shows an example of a configuration of a base component in accordance with some embodiments of the disclosed subject matter.

FIG. 7 shows an example of a configuration of base component 212 in accordance with some embodiments of the disclosed subject matter. In some embodiments, as illustrated, base component 212 can include two or more connectors 420-1 and 420-2, a user device interface 710, a hub 714, and a hardware processor 410.

In some embodiments, connectors 420-1 and/or 420-2 can be any connectors suitable for establishing a mechanical connection and an electrical connection with modules when attached to the base component. For example, a magnetic connector as described above in connection with FIG. 1, and below in connection with FIG. 9 and FIG. 10, can be used.

In some embodiments, user device interface 710 can be any interface suitable for establishing an electrical connection with a user device (e.g., user device 114). For example, a USB interface, an HDMI interface, a Bluetooth interface, an 802.11-type wireless interface, a near field communication interface, an Ethernet interface, any other suitable interface, and/or any suitable combination thereof can be used.

In some embodiments, hub 714 can be implemented using any suitable hardware, firmware and/or software for distributing power and/or signals to and/or from user device interface 710, connector 420-1, and/or connector 420-2. For example, hub 714 can be implemented as a USB hub, an HDMI hub, an Ethernet hub, any other suitable hardware, firmware and/or software for providing multiple downstream inputs/outputs corresponding to a single upstream input/output, and/or any suitable combination thereof. Note that, in some embodiments, hub 714 can be omitted, such as in cases in which base 212 communicates with user device 114 using a wireless communication protocol (e.g., Bluetooth, 802.11, etc.), in which case signals and/or power can be provided to connectors 420-1 and 420-2 using any suitable technique or combination of techniques.

In some embodiments, hub 714 can receive signals from user device interface 710 and determine whether those signals are to be communicated to hardware processor 410, or to one or both of connectors 420-1 and 420-2. Additionally, in some embodiments, hub 714 can receive signals from one or more of hardware processor 410, connector 420-1 and/or 420-2, and send those signals, if appropriate, to user device 114 via user device interface 710.

In some embodiments, hub 714 can prepare signals received from user device 114 for transmission to hardware processor 410, or a modular component connected via connector 420-1 or 420-2. For example, when a signal is received via user device interface 710 in a first format, hub 714 can decode the signal and re-encode the signal into a format suitable for transmission via connector 420-1, connector 420-2, and/or hardware processor 410. As another example, when a signal is received via connector 420-1 and/or 420-2 (e.g., a media signal), hub 714 can decode the signal and re-encode the signal into a format suitable for transmission via user device interface 710.

Although not shown, note that base component 212 can also include one or more downstream interfaces (e.g., downstream interface 412, as described in connection with FIG. 4).

In some embodiments, hardware processor 410 can be configured to process signals received from user device 114 and/or from other modular components, as described above in connection with FIG. 4.

Figure 8:
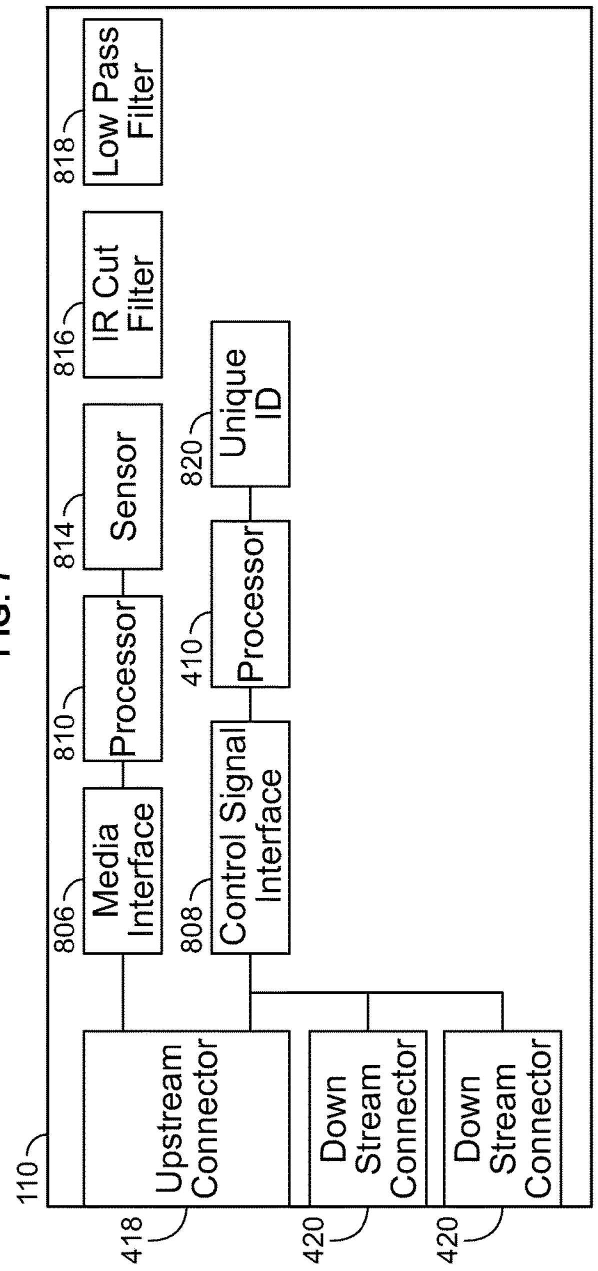
FIG. 8 shows an example of a sensor component in accordance with some embodiments of the disclosed subject matter.

FIG. 8 shows an example 110 of a sensor component in accordance with some embodiments of the disclosed subject matter. As illustrated, in some embodiments, sensor component 110 can include an upstream connector 418, two downstream connectors 420, a media signal interface 806, control signal interface 808, a first hardware processor 410, a second hardware processor 810, an image sensor 814, an infrared cut filter 816, a low pass filter 818, and unique ID storage 820.

In some embodiments, media signal interface 806 and/or control signal interface 808 can be implemented as an interface 412 and/or 416, as described above in connection with FIG. 4, and/or replicate the functions of 412 and/or 416. In some embodiments, media signal interface 806 can be configured to receive only media signals. For example, media signal interface can be an HDMI interface, and/or any other interface suitable for media signals.

In some embodiments, image sensor 814 can be any suitable image sensor for capturing image data. For example, image sensor 814 can be implemented using one or more charge-coupled device (CCD) sensors, complementary metal-oxide semiconductor sensors (CMOS), color filter arrays, and/or any other suitable type of image sensor.

In some embodiments, hardware processor 810 can be any suitable hardware processor (e.g., a hardware processor as described above in connection with hardware processor 410) and be configured to perform any suitable image processing and/or control functions. For example, hardware processor 810 can perform demosaicing, defect correction, color space correction, auto-exposure, auto-focusing, automatic white balancing, scaling, image filtering, noise reduction, distortion correction, image compression, any of the image processing functions described above in connection with image processing program 218 of FIG. 2, and/or any other suitable image processing functions. In some embodiments, some or all of the image processing functions can be performed by a single hardware processor 810, and/or in combination with any other suitable processors (e.g., a graphics processing unit). Note that, although not shown, sensor component 110 can include any suitable memory for storing instructions for hardware processor 810. Additionally or alternatively, hardware processor 810 may not perform image processing, and instead may pass image data only (e.g., image data in raw format) unprocessed to hardware processor 410 and/or to media interface 806.

In some embodiments, hardware processor 810 can perform image compression and/or conversion. For example, in some embodiments, hardware processor 810 can compress raw image data into a compressed image format such as JPEG, H.264, H.265, and/or any other suitable compressed image format.

In some embodiments, infrared cut filter 816 can be implemented using any suitable infrared cut filter. For example, an infrared cut filter that blocks any suitable range of infrared wavelengths (e.g., a filter that blocks light rays having a wavelength longer than 700 nanometers) can be used.

In some embodiments, infrared cut filter 816 can be movable between an engaged position and a disengaged position. For example, infrared cut filter 816 can be connected to an actuator, motor or any device suitable for moving the infrared cut filter into a position that is in front of image sensor 814 such that an image captured by image sensor 814 will be affected by infrared cut filter 816.

In some embodiments, low pass filter 818 can be implemented using any optical low pass filter (e.g., a filter suitable for anti-aliasing).

In some embodiments, low pass filter 818 can be movable between an engaged position and a disengaged position. For example, low pass filter 818 can be connected to an actuator, motor or any device suitable for moving low pass filter 818 into a position that is in front of image sensor 814 such that an image captured by image sensor 814 will be affected by low pass filter 818.

In some embodiments, hardware processor 410 can receive signals from upstream and/or downstream modular components and perform any suitable function based on the signal. For example, as described above in connection with FIG. 4, hardware processor 410 can receive a control signal including a modular component identifier, and based on the modular component identifier, can either re-transmit the signal or cause the sensor component to take an action based on the signal. As a more particular example, hardware processor 410 can receive a control signal that includes a modular component identifier, and upon determining that the modular component identifier matches a predetermined unique identifier associated with the sensor component, hardware processor 410 can pass the signal on to hardware processor 810, which can take an action based on the signal. As another more particular example, upon determining that a modular component identifier included in a signal matches a predetermined unique identifier associated with the sensor component, hardware processor 410 can cause image sensor 814 to capture an image.

In some embodiments, hardware processor 810 can cause image sensor 814 to capture an image based on parameters included in a signal received by hardware processor 410, such as an exposure parameter, a focus parameter, a resolution parameter, any other suitable image capture parameter, and/or any suitable combination of image capture parameters. For example, hardware processor 410 can receive a signal that includes an ISO sensitivity (an exposure parameter) of one hundred, pass the signal on to hardware processor 810, and hardware processor 810 can cause the image sensor to capture an image using an ISO sensitivity of one hundred.

Figure 9:
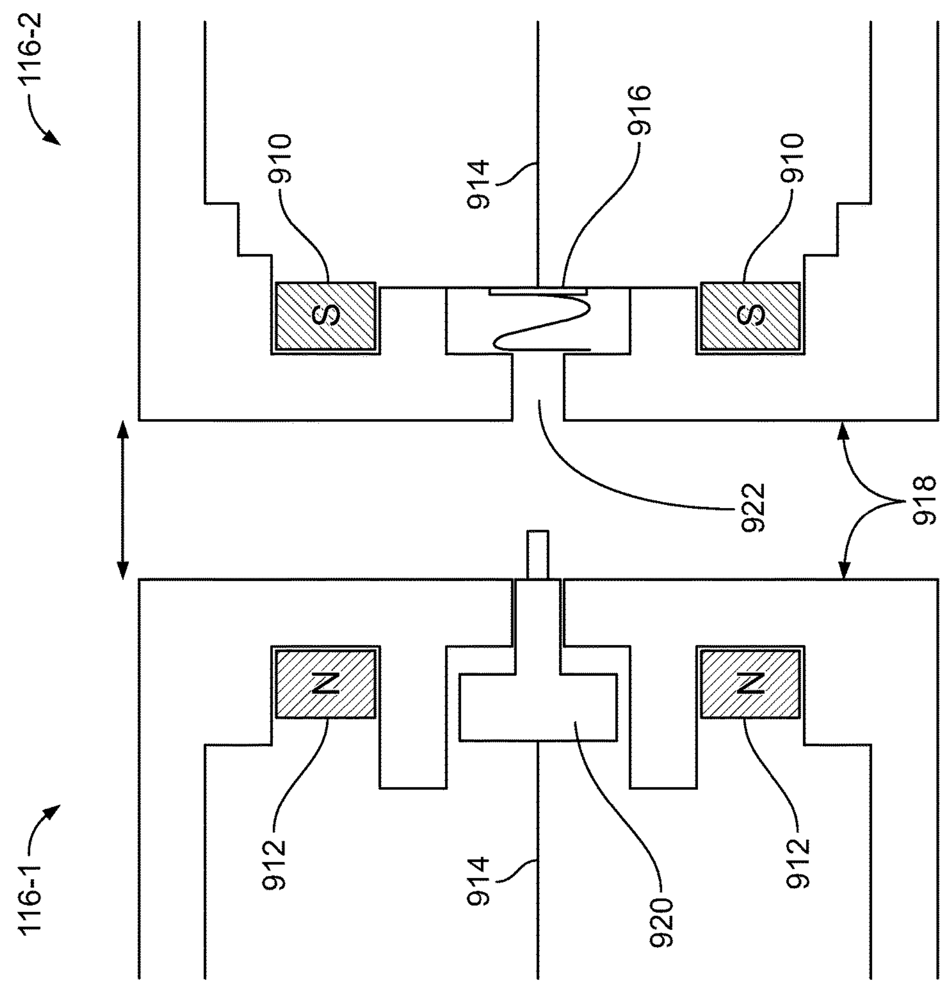
FIG. 9 shows an example of a cross-sectional view of two magnetic connectors in accordance with some embodiments of the disclosed subject matter.

FIG. 9 shows an example of a cross-sectional view of two magnetic connectors 116-1 and 116-2 in accordance with some embodiments of the disclosed subject matter. As illustrated, in some embodiments, a magnetic connector can include an electrical wire 914, two magnets 910, two magnets 912, a spring loaded contact 920 and/or spring contact 916, and a contact plane 918. In some embodiments, connector 116-1 can include a spring loaded contact 920 and connector 116-2 can include a corresponding spring contact 916. In some embodiments, magnetic connectors 116-1 and 116-2 can include any suitable number of electrical wires 914, magnets 912, spring loaded contacts 920, spring contacts 916, and/or contact planes 918.

In some embodiments, magnets 910 and/or 912 can be configured on magnetic connector 116 such that their polarities face any suitable direction. For example, as shown, magnetic connector 116-1 can be configured to have two or more magnets 912 positioned such that the north pole of each magnet 912 faces outwardly from the connector (sometimes referred to herein as a north connector). Conversely, in some embodiments, magnetic connector 116-2 can be configured to have two or more magnets 910 positioned such that the south pole of each magnet 910 faces outwardly from the connector (sometimes referred to herein as a south connector). In some embodiments, each magnetic connector 116 can have one or more north-facing magnets 912 and one or more south-facing magnets 910 such that each modular component can connect with any other modular component via a magnetic connector 116.

In some embodiments, as shown, magnets 910 and/or 912 can be positioned behind contact plane 918 in any suitable manner such that the face of magnet 910 and/or 912 is not exposed on contact plane 918 of the magnetic connector.

In some embodiments, as illustrated, magnetic connector 116-1 can include one or more electrical contacts 920. In some embodiments, spring loaded contact 920 can be any suitable electrical contact for conducting electrical signals when brought into contact with another corresponding electrical contact. For example, spring loaded contact 920 can be implemented using a spring loaded electrical pin, which can be connected to a conductive wire (e.g., wire 914), and can be positioned upon the body of magnetic connector 116-1 such that a portion of the spring loaded pin protrudes outward past the contact plane. In such an example, a spring positioned within the spring loaded contact 920 can be configured to bias the spring loaded pin away from the interior of connector 116-1 and to compress when the protruding portion of spring loaded contact 920 is pushed inward by making contact with a corresponding electrical contact (e.g., spring contact 916).

In some embodiments, as illustrated, a magnetic connector 116-2 can include one or more spring contacts 916. In some embodiments, spring contact 916 can be implemented using any suitable electrical contact, adaptable with a spring, and suitable for conducting electrical signals when brought into contact with a corresponding electrical contact (e.g., spring loaded contact 920). For example, spring contact 916 can be implemented using a flat and conductive contact plate that can be connected to a conductive wire (e.g., wire 914) and include a spring configured to bias the contact plate away from the interior of connector 116-2 and to compress when the plate makes contact with a protruding portion from corresponding spring loaded contact 920. In some embodiments, spring connector 116 can be positioned behind a hole 922 in the connector body, hole 922 being configured to receive a protruding portion from a corresponding spring loaded contact 920.

In some embodiments, each modular component in a modular camera system can include one or more magnetic connectors 116-1 and one or more magnetic connectors 116-2 using any suitable configuration. For example, one or more magnetic connectors 116-1 can be implemented as downstream connector 420 (e.g., as described above in connection with FIG. 4) while one or more magnetic connectors 116-2 can be implemented as upstream connector 418.

FIG. 10A shows an example 1000 of a magnetic connector in accordance with some embodiments of the disclosed subject matter. As illustrated, in some embodiments, magnetic connector 1000 can include four magnets 1010, a power contact 1014, a ground contact 1016, a serial data contact 1018, a positive media signal contact 1020, a negative media signal contact 1022, a serial clock contact 1024, and a surface bump 1012.

FIG. 10B shows an example 1002 of a magnetic connector in accordance with some embodiments of the disclosed subject matter. As illustrated, in some embodiments, magnetic connector 1002 can include the same elements as magnetic connector 1000, omitting media signal contacts 1020 and 1022.

In some embodiments, magnetic connector 116, as described above in connection with FIGS. 1 and 9, can incorporate the features of magnetic connector 1000 and/or magnetic connector 1002.

In some embodiments, each magnetic connector 116 of a modular camera system can be configured to allow connection with any other magnetic connector of the modular camera system having the appropriate polarity by positioning its magnets 1010 in a location along the magnetic connector that is uniform for each magnetic connector. For example, as shown in FIG. 10A, magnetic connector 1000 can include four magnets 1010, each of which is located in relative proximity to a different one of the four corners of magnetic connector 1000. As another example, magnetic connector 1000 can include one or more magnets 1010 located at the center of magnetic connector 1000 and/or at any other suitable positions.

In some embodiments, power contact 1014, ground contact 1016, serial data 1018, positive media signal contact 1020, negative media signal contact 1022, and/or serial clock contact 1024 can be implemented using any suitable electrical contact for establishing electrical connection with a corresponding magnetic connector 1000. For example, each of contacts 1014, 1016, 1018, 1020, and 1022 can be implemented using spring contact 916 and/or spring loaded contact 920 as described above in connection with FIG. 9.

In some embodiments, serial data contact 1018 and serial clock contact 1024 can be used to transmit any suitable signals. For example, serial data contact 1018 can transmit control signals to modular components (e.g., signals that can cause a modular component to perform a certain function) and serial clock contact 1024 can transmit a synchronizing clock signal.

In some embodiments, media signal contacts 1020 and 1022 can be used to transmit any suitable signals. For example, image data signals, video data signals, audio data signals, and/or any other suitable data signals can be transmitted.

In some embodiments, ground contact 1016 can protrude farther out from the surface of magnetic connector 1000 and/or 1002 than one or more other contacts included in magnetic connector 1000 and/or 1002 (e.g., when implemented as spring loaded contact 920, as described above in connection with FIG. 9) such that when magnetic connector 1000 and/or 1002 is brought into contact with a corresponding magnetic connector 1000 and/or 1002 having a corresponding ground contact 1016 (e.g., implemented as spring contact 916, as described above in connection with FIG. 9), the ground contacts can establish an electrical connection prior to the other contacts included in magnetic connectors 1000 and/or 1002.

FIG. 11 shows an example of lens component 118 in accordance with some embodiments of the disclosed subject matter. As illustrated, in some embodiments, a lens component can include an upstream connector 418, a downstream connector 420, a hardware processor 410, a linear actuator 1110, an aperture 1114, and a lens 1112. In some embodiments, a lens component can include any suitable number of upstream connectors 418, downstream connectors 420, hardware processors 410, linear actuators 1110, apertures 1114, and lenses 1112. Although not shown, lens component 118 can include interfaces 412 and 416, and/or an interface to replicate the functions of 412 and/or 416.

In some embodiments, hardware processor 410 can be configured to control aperture 1114, lens 1112, and linear actuator 1110 such that can be used to focus light that is passed to an attached sensor component (e.g., sensor component 110). For example, hardware processor 410 can be configured to receive signals that include instructions and/or parameters for lens 1112, linear actuator 1110, and/or aperture 1114, and control them accordingly. As a more particular example, hardware processor 410 can receive a signal that includes an aperture area parameter, and upon receiving the signal, hardware processor 410 can cause aperture 1114 to expand or contract based on the aperture area parameter. As another example, hardware processor 410 can receive a signal that includes a focal length parameter, and upon receiving the signal, the hardware processor 410 can cause linear actuator 1110 to move lens 1112 based on the focal length parameter. In some embodiments, linear actuator 1110 can be omitted and lens 1112 can have a fixed focal length.

In some embodiments, a lens component can include two or more lenses 1112. In some embodiments, the two or more lenses 1112 can be configured such that images captured by an attached sensor component (e.g., sensor component 110, as described above) will be captured through each lens 1112 simultaneously or nearly simultaneously. In some embodiments, the two or more lenses 1112 can be configured to be switched into and/or out of position for individual use. For example, the two or more lenses 1112 can be connected to any actuator suitable for moving the two or more lenses 1112 into and out of position for image capture. As a more particular example, the two or more lenses 1112 can be positioned parallel to each other and linear actuator 1110 can be positioned adjacent to the lenses and configured to push one or more of the lenses into a position behind aperture 1114 when linear actuator 1110 is engaged.

In some embodiments, aperture 1114 can be any aperture suitable for photography. For example, an expandable and contractible circular aperture can be used. In some embodiments, lens component 118 can include two or more apertures 1114. In some embodiments, two or more apertures 1114 can be connected to an actuator suitable for moving the two or more apertures 1114 into and out of position for image capture. In some embodiments, aperture 1114 can have a fixed size and shape.

Figure 12:
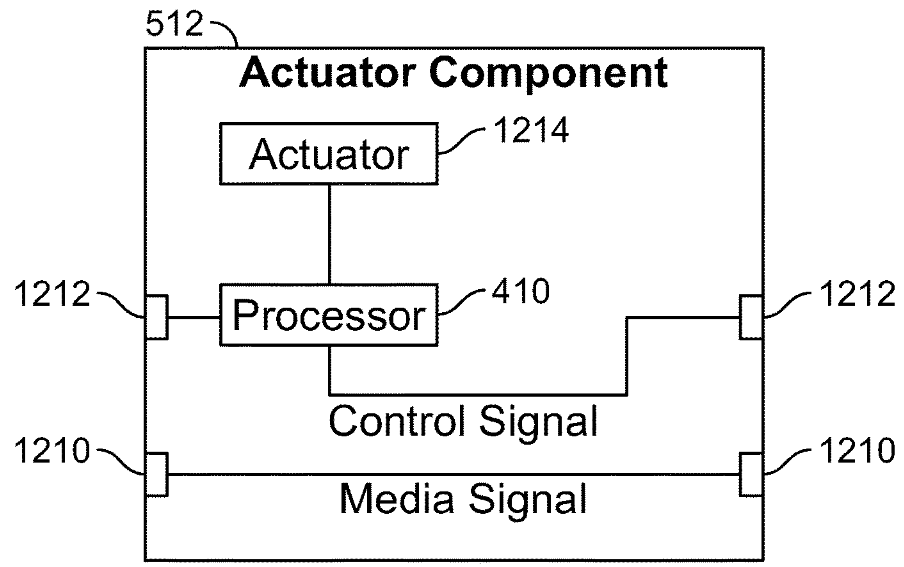
FIG. 12 shows an example of hardware that can be used to implement an actuator component in accordance with some embodiments of the disclosed subject matter.

FIG. 12 shows an example of hardware that can be used to implement actuator component 512 in accordance with some embodiments of the disclosed subject matter. As shown, actuator component 512 can include media signal contacts 1210, control signal contacts 1212, a hardware processor 410, and an actuator 1214.

In some embodiments, media signal contacts 1210 can each be implemented as media signal contacts 1020 and/or 1022 as described in connection with FIG. 10A. In some embodiments, control signal contacts 1212 can each be implemented as serial data contact 1018 and/or serial clock contact 1024, as described above in connection with FIG. 10A.

In some embodiments, actuator component 512 can be configured to move one or more modular components that are attached to it by rotating, expanding, contracting, turning, pinching, and/or any other suitable type of movement. For example, actuator component 512 can be implemented as a rotary actuator component, such as rotary actuator component 1300 as described below in connection with FIG. 13. In such an example, actuator component 512 can include two rigid portions, attached via actuator 1214, such that one of the portions can rotate along a central plane, relative to the other portion, and thereby cause one or more modular components attached to the rotating portion to likewise rotate. As another example, actuator 1214 can be implemented using a linear actuator that can cause actuator component 512 to expand and/or contract. In such an example, actuator component 512 can include two rigid portions, attached via linear actuator 1214, such that the portions can move linearly toward or away from each other, based on operation of linear actuator 1214 and causing actuator component 512 to contract or expand, respectively, and also thereby causing one or more modular components attached to actuator component 512 to likewise move linearly.

Figure 13:
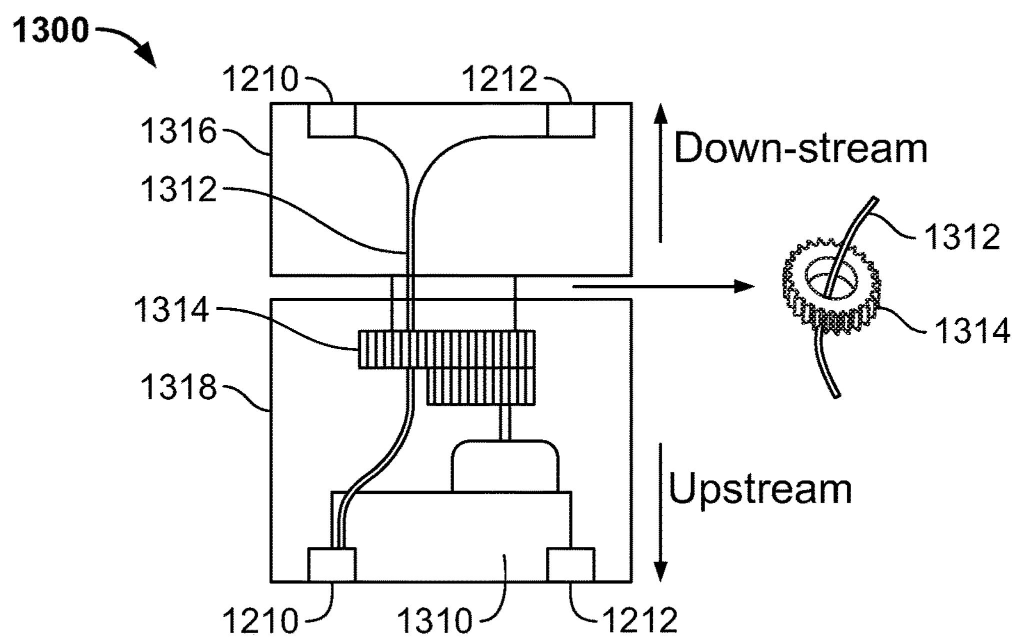
FIG. 13 shows an example of a cross-sectional view of a rotary actuator component in accordance with some embodiments of the disclosed subject matter.

FIG. 13 shows an example of a cross-sectional view of a rotary actuator component 1300 in accordance with some embodiments of the disclosed subject matter. As shown, rotary actuator component 1300 can include media signal contacts 1210, control signal contacts 1212, a motor 1310, a signal line 1312, a gear configuration 1314, a downstream housing 1316, and an upstream housing 1318.

In some embodiments, motor 1310 can be any motor suitable for rotary movement. For example, a servomotor, a multi-position actuator, a stepping actuator, an indexing actuator, a pneumatic rotary actuator, any other motor suitable for rotary movement, and/or any suitable combination thereof can be used.

In some embodiments, motor 1310, gear configuration 1314, downstream housing 1316, and upstream housing 1318 can be configured to cause upstream housing 1318 to rotate relative to downstream housing 1316 via motor 1310. For example, as illustrated in FIG. 13, motor 1310 can be attached to gear configuration 1314 and to upstream housing 1318 while gear configuration 1314 is attached to downstream housing 1316 such that motor 1310 can cause gear configuration 1314 to rotate, which in turn can cause downstream housing 1316 to rotate relative to upstream housing 1318.

In some embodiments, motor 1310 and gear configuration 1314 can be configured such that one or more signal lines 1312 can pass through gear configuration 1314 in order to couple media signal contacts 1210 with each other and couple control signal contacts 1212 with each other. For example, signal line 1312 can be configured to pass through gear configuration 1314, and through an opening in downstream housing 1316 and upstream housing 1318 such that signal line 1312 extends substantially along the rotational axis of downstream housing 1316 and upstream housing 1318.

Figure 14:
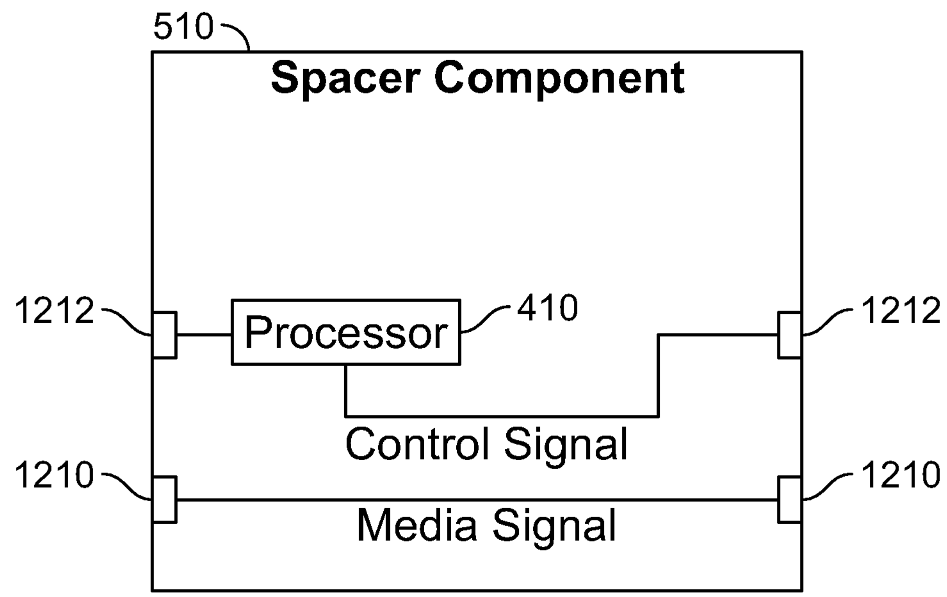
FIG. 14 shows an example of hardware that can be used to implement a spacer component in accordance with some embodiments of the disclosed subject matter.

FIG. 14 shows an example 510 of hardware that can be used to implement spacer component 510 in accordance with some embodiments of the disclosed subject matter. As shown, spacer component 510 can include media signal contacts 1210, control signal contacts 1212, and a hardware processor 410.

In some embodiments, spacer component 510 can be configured to transmit signals to other modular components that it is coupled to. For example, signals can be retransmitted as described above in connection with FIG. 4. As another example, as illustrated in FIG. 14, spacer component 510 can have two connectors directly connected (e.g. via an electrical wire) such that signals (e.g., media signals) are transmitted directly between two modular components attached to spacer component 510 without the use of hardware processor 410.

In some embodiments, spacer component 510 can have any suitable shape. For example, spacer component 510 can have a right angle shape as described below in connection with FIG. 27A.

In some embodiments, hardware processor 410 can be configured to transmit to a user device (e.g., user device 114, as described above) signals containing information identifying the spacer component, and/or identifying to which modular components the spacer component is attached. For example, in a case in which spacer component 510 has a right angle shape, and is attached via a connector (e.g., magnetic connector 116, as described above) to a sensor component (e.g., sensor component 110, as described above), and attached via a second connector to a base component (e.g., base component 112, as described above), hardware processor 410 can transmit a signal, via the base component, to the user device. The signal can identify spacer component 510 as a right angle spacer component, indicate that it is attached to a sensor component downstream, and/or indicate that is attached to a base component upstream.

Figure 15:
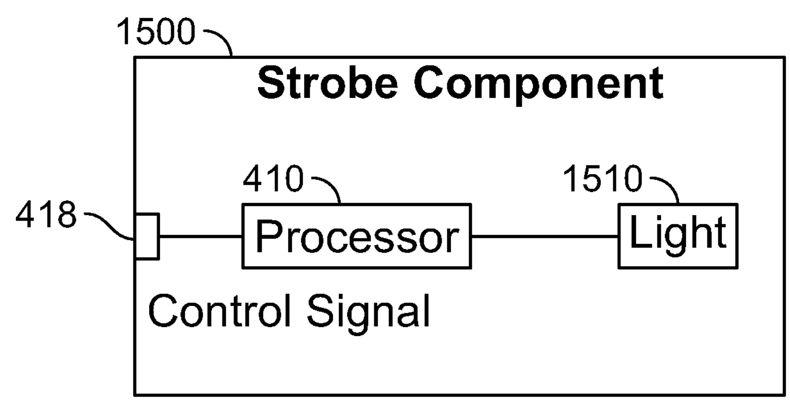
FIG. 15 shows an example of a strobe component in accordance with some embodiments of the disclosed subject matter.

FIG. 15 shows an example 1500 of a strobe component in accordance with some embodiments of the disclosed subject matter. As shown, strobe component 1500 can include an upstream connector 418, a hardware processor 410, and a light 1510.

In some embodiments, strobe component 1500 can be configured to produce strobing light. For example, hardware processor 410 can be configured to cause light 1510 to strobe on and off at any suitable speed, interval, brightness, and/or any other parameter based on signals received via upstream connector 418. For example, hardware processor 410 can receive a signal indicating a strobing pattern and brightness and cause light 1510 to strobe on and off according to the pattern and brightness. In some embodiments, hardware processor 410 can cause light 1510 to emit a single flash, maintain lighted for a period of time, and/or operate in any other suitable fashion.

Figure 16:
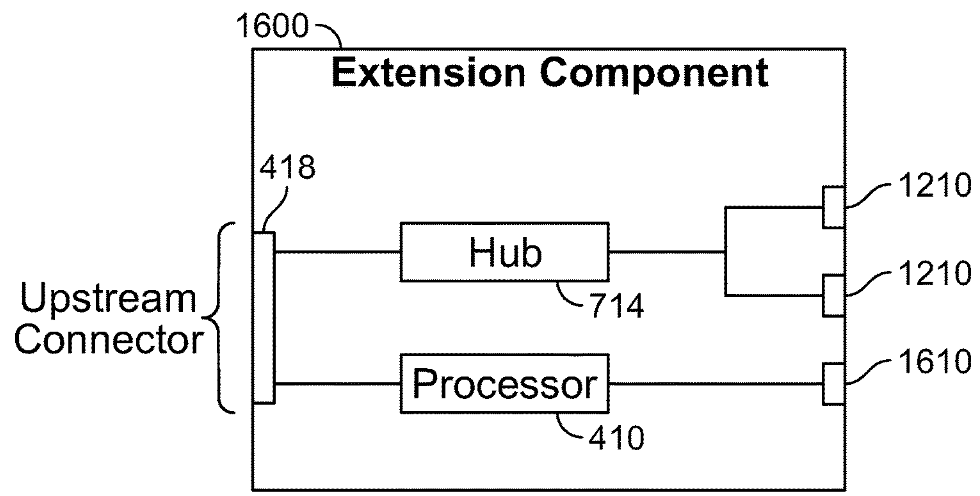
FIG. 16 shows an example of an extension component in accordance with some embodiments of the disclosed subject matter.

FIG. 16 shows an example 1600 of an extension component in accordance with some embodiments of the disclosed subject matter. As illustrated, extension component 1600 can include upstream connector 418, media signal contacts 1210, a hardware processor 410, a hub 714, and a general purpose input/output (hereinafter "GPIO") 1610.

In some embodiments, base component 112, as described above in connection with FIGS. 1 and 7 can be implemented as extension component 1600.

In some embodiments, though not shown in FIG. 16, extension component 1600 can include any suitable number of connectors (e.g., magnetic connectors 116). In some embodiments, extension component 1600 can be coupled with a base component (e.g., base component 112, as described above) such as to include more sensor components (e.g., sensor component 110, as described above) in a modular camera system than the base component can suitably attach with. For example, three sensor components can be included in a modular camera system by attaching a base component (e.g., base component 212, as described above) having only two connectors (e.g., magnetic connectors 116), with extension component 1600, attaching two sensor components to the extension component via two connectors of the extension component, attaching the base component with the extension component via a second connector, and attaching the remaining sensor component with the base component.

In some embodiments, GPIO 1610 can be configured to couple extension component 1600 with any suitable auxiliary devices. For example, GPIO 1610 of extension component 1600 (and/or any other suitable component) can be configured to connect to any suitable auxiliary device that is not configured to physically connect to components of modular camera systems described herein (e.g., modular camera system 100 as described aboce in connection with FIG. 1). In a more particular example, GPIO 1610 can be used to connect a modular camera system that incorporates extension component 1600 to an external source of illumination (e.g., an off-camera flash), an electronically controlled stage (e.g., on which an object can be placed to be rotated to any suitable position), auxiliary sensors that are not configured to physically connect with components of the modular camera (e.g., a non-modular camera, an antenna, etc.), any other suitable device, and/or any suitable combination thereof.

Figure 17:
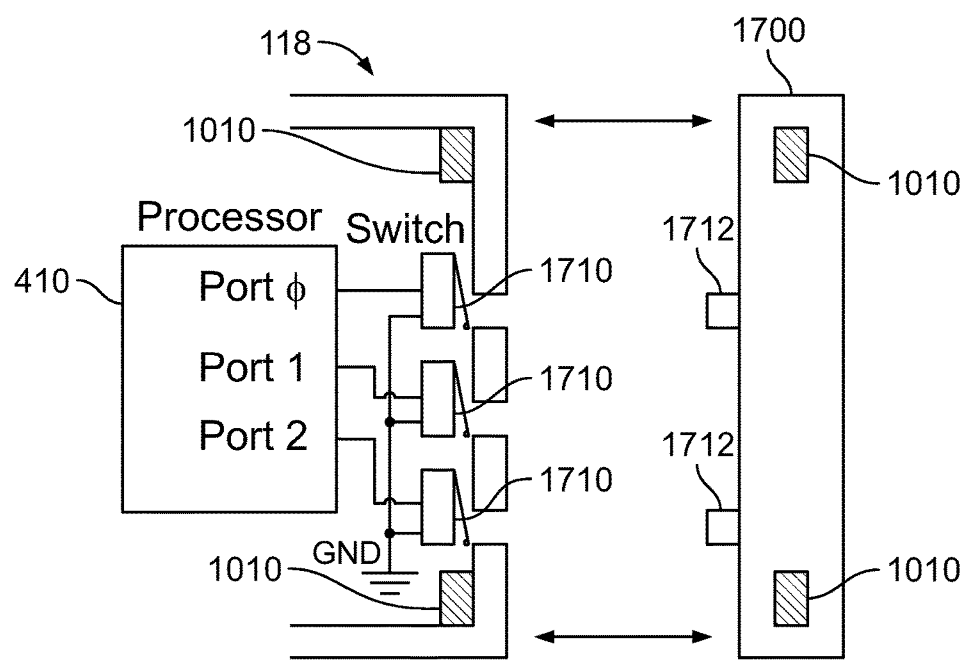
FIG. 17 shows an example of a cross-sectional view of a lens component engaging an optical component in accordance with some embodiments of the disclosed subject matter.

FIG. 17 shows an example of a cross-sectional view of lens component 118 engaging an optical component 1700 in accordance with some embodiments of the disclosed subject matter. As illustrated, lens component 118 can include three switches 1710, two magnets 1010, and a hardware processor 410 while optical component 1700 can include two protrusions 1712 and two magnets 1010.

In some embodiments, switches 1710 and protrusions 1712 can be configured such that, when optical component 1700 is attached to lens component 118 (e.g., via magnets 1010), protrusions 1712 engage one or more switches 1710 and hardware processor 410 can identify optical component 1700 (e.g., what type of optical component) based on which switches 1710 are engaged. For example, as shown in FIG. 17, optical component 1700 can have two protrusions 1712 disposed on optical component 1700 at a location such that when optical component 1700 is attached to lens component 118, protrusions 1712 engage two specific switches 1710. In such an example, switches 1710 transmit a signal to hardware process 410, and based on which switches are engaged, hardware processor 410 can determine the identity of optical component 1700. Hardware processor 410 can then transmit a signal upstream toward user device (e.g., user device 114, as described above) indicating the identity of optical component 120.

Figure 18:
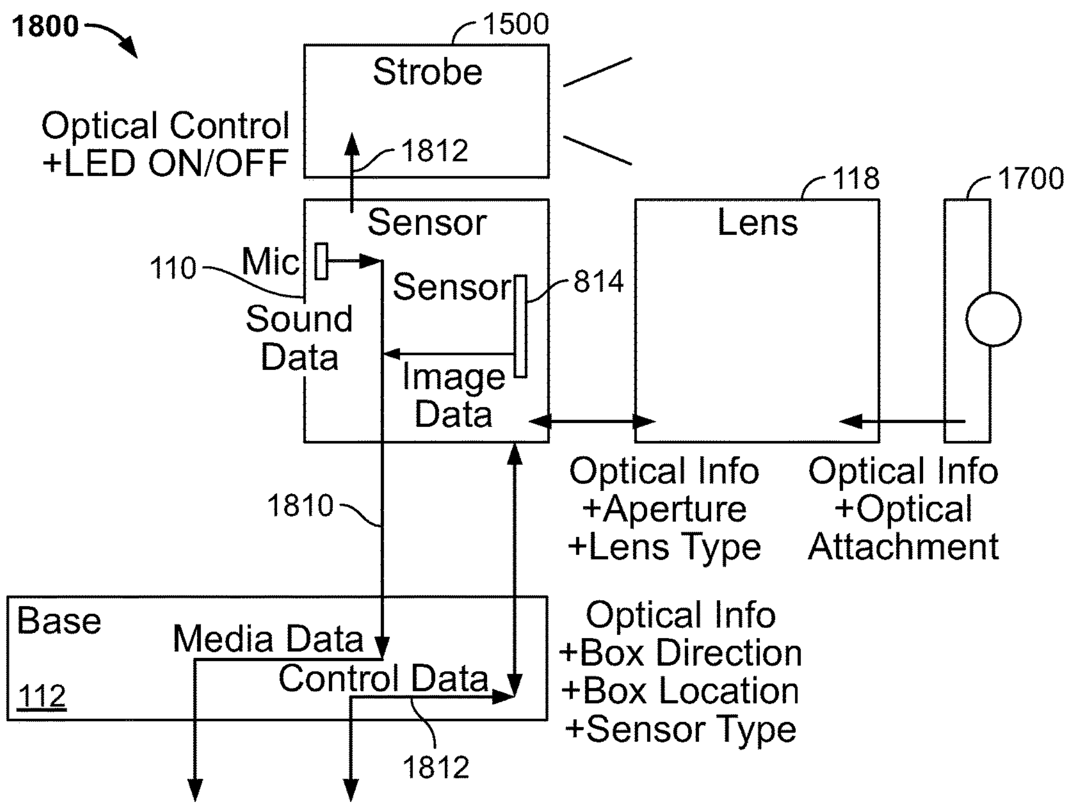
FIG. 18 shows an example of information flow in a modular camera system in accordance with some embodiments of the disclosed subject matter.

FIG. 18 shows an example 1800 of information flow in a modular camera system in accordance with some embodiments of the disclosed subject matter. As shown, modular camera 1800 can include a strobe component 1500, a sensor component 110, a lens component 118, an optical component 1700, and a base component 112. Media data 1810, which can include image data, sound data, and/or any other suitable data, can be transmitted from sensor component 110 to base component 112. Control data 1812 can be transmitted between base component 112, sensor component 110, strobe component 1500, lens component 118, and optical component 1700 in either direction. Control data 1812 can include information identifying each modular component, status information for each modular component, location information for each modular component, parameters for each modular component, commands for each modular component, and/or any other suitable information.

Figure 19:
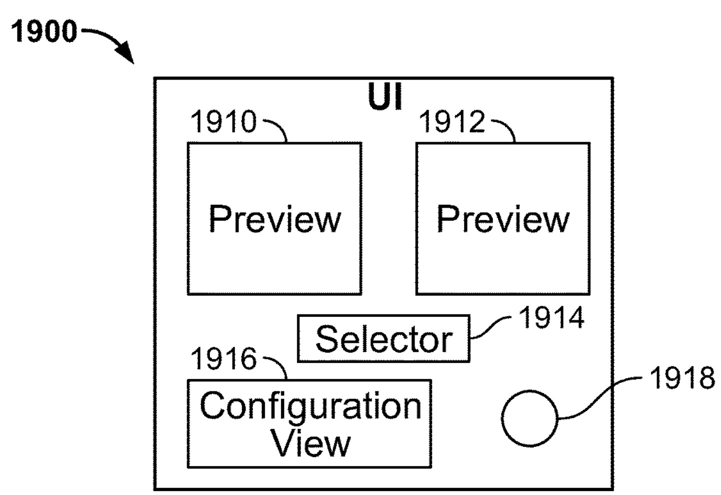
FIG. 19 shows an example of a user interface that can be provided by a user device in accordance with some embodiments of the disclosed subject matter.

FIG. 19 shows an example 1900 of a user interface that can be provided by user device 114 in accordance with some embodiments of the disclosed subject matter. As shown, user interface 1900 can include image previews 1910 and 1912, a selector 1914, a configuration view 1916, and a shutter button 1918.

In some embodiments, such as in a case in which two or more sensor components are used in a modular camera system (e.g., as described in connection with and shown in FIG. 2), image previews 1910 and 1912 can display previews of images that can be captured by the two sensor components (e.g., as described below in connection with FIG. 20). In some embodiments, configuration view 1916 can show a reproduction of the physical arrangement of the modular camera system, as described below in connection with FIG. 20. In some embodiments, shutter button 1918 can be configured to cause the two or more sensor components to capture an image. In some embodiments, shutter button 1918 can be omitted.

In some embodiments, selector 1914 can present a user with actions that can be performed using the modular camera system as it is currently configured. For example, if the modular camera system includes a strobe component (e.g., strobe component 1500), selector 1914 can include an option for causing the modular camera system to capture an image (or images) using strobe component 1500. As another example, if the modular camera system includes a lens component with an actuator for changing the focal length of the lens component (e.g., lens component 118 as described above in connection with FIG. 11), selector 1914 can include an option for causing the modular camera system to capture a series of images having different depths of field that can be used (e.g., by user device 114) to generate an image in which the area which is shown as being in focus can be changed based on user input. As yet another example, if the modular camera system includes an actuator component that can rotate one or more downstream components in relation to one or more upstream components (e.g., rotary actuator component 1300), selector 1914 can include an option for causing the modular camera system to capture a series of images with actuator component 1300 rotating to various angles that can be used (e.g., by user device 114) to generate a panoramic image. In some implementations, user device 114 can determine, based on the configuration of the modular camera system, which functions the camera can be perform, and can cause user interfaces corresponding to each function to be presented. Additionally, in some embodiments and/or for some functions, a user interface element corresponding to a certain function can be selected by a user via user interface 1900 to perform that function without selecting shutter button 1918. Alternatively, in some embodiments and/or for some functions, selecting a user interface element corresponding to a certain function can cause that function can enable that function such that, when shutter button 1918 is selected, one or more images are captured in accordance with that function.

Figure 20:
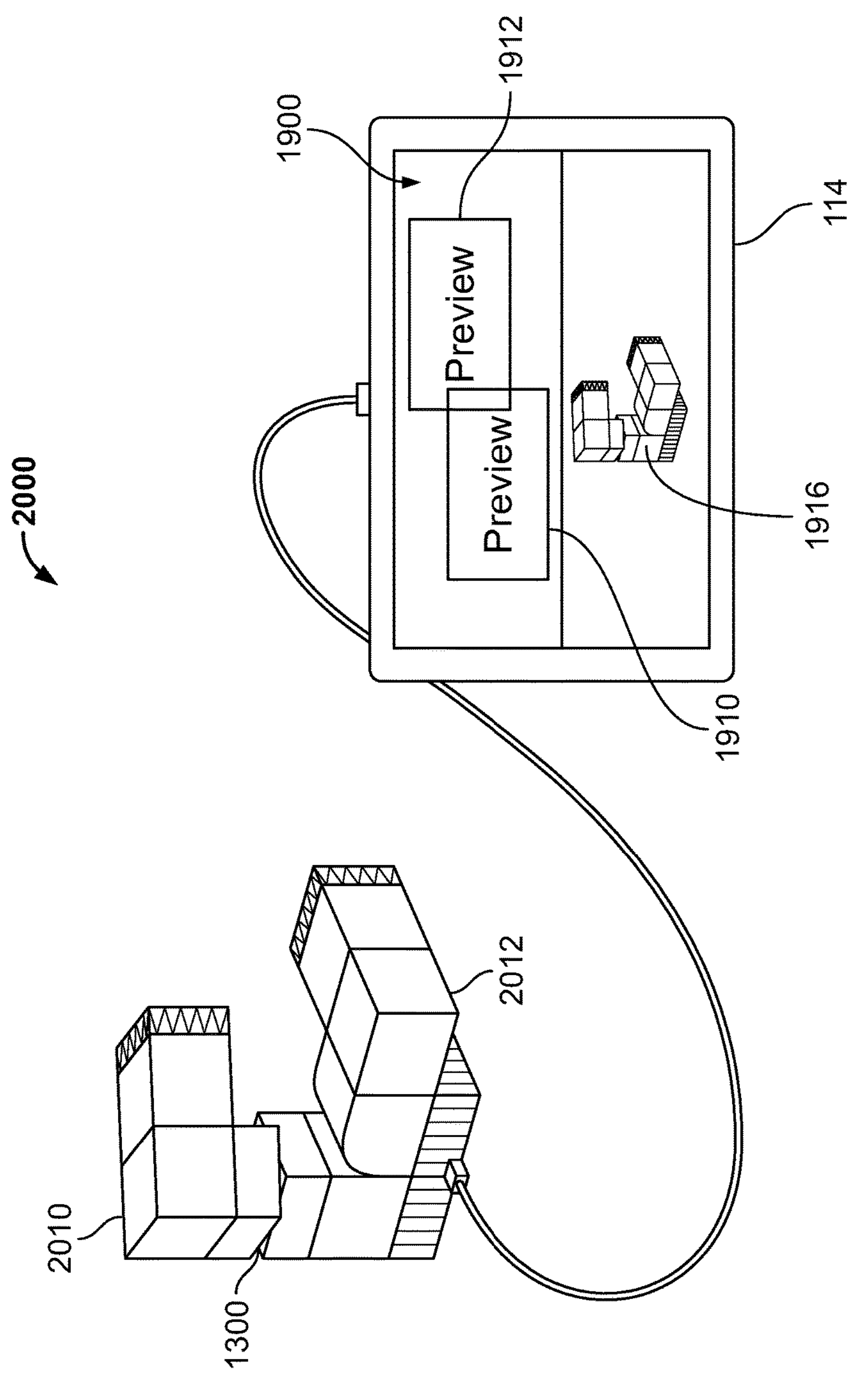
FIG. 20 shows another example of a modular camera system in accordance with some embodiments of the disclosed subject matter.

FIG. 20 shows an example 2000 of a modular camera system in accordance with some embodiments of the disclosed subject matter. As illustrated, modular camera system 2000 can include a first sensor component 2010, a second sensor component 2012, rotary actuator component 1300, and user device 114. User device 114 can display user interface 1900, which, as described above in connection with FIG. 19, can include image preview 1910 and 1912, and configuration view 1916.

In some embodiments, sensor components 2010 and 2012 can be implemented using two sensor components 110, as described above in connection with FIG. 8.

In some embodiments, user interface 1900 can display an image preview for each sensor component 2010 and 2012 included in the modular camera system. For example, as shown in FIG. 20, user interface 1900 can display image preview 1910 corresponding to sensor component 2010, and image preview 1912 corresponding to sensor component 2012.

In some embodiments, configuration view 1916 can be produced by user device 114 based on information sent by the modular components in modular camera system 2000. For example, each modular component attached to sensor components 2010 and 2012 can transmit a signal upstream to user device 114 indicating the identity of the modular component, its position (e.g., the position of an actuator in an actuator component), and/or which modular components it is attached to. As a more particular example, rotary actuator component 1300 can transmit a signal to user device 114 indicating that it is a rotary actuator component, that it is attached to downstream sensor component 2010, and that its rotary actuator is at a certain angular position. Based on the received signal, user device 114 can produce a corresponding portion of configuration view 1916 based on the received signal.

Figure 21:
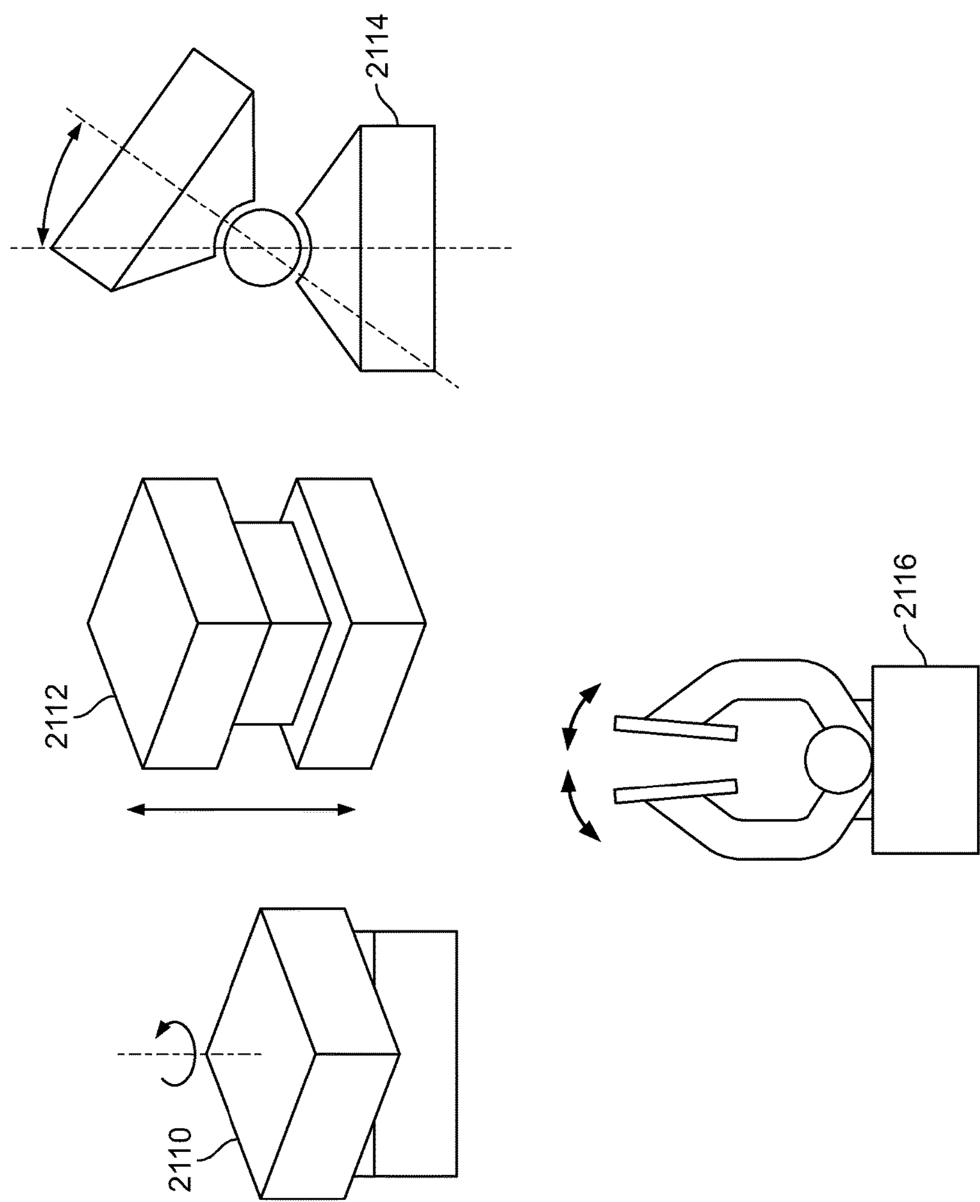
FIG. 21 shows examples of actuator components in accordance with some embodiments of the disclosed subject matter.

FIG. 21 shows examples of actuator components in accordance with some embodiments of the disclosed subject matter. As illustrated in FIG. 21, actuator component 2110 can be implemented as a rotational joint. In some embodiments, actuator component 2110 can be implemented as rotary actuator component 1300 as described above in connection with FIG. 13.

In some embodiments, actuator component 2112 can be implemented as an expanding and/or contracting actuator component, for example, as described above in connection with FIG. 12.

In some embodiments, actuator component 2114 can be an angular actuator component. As shown, in some embodiments, angular actuator component 2114 can include a circular and/or cylindrical joint that connects two portions of the actuator component, and allows at least one portion of the actuator component to turn along an axis of the joint, forming an angular attachment.

In some embodiments, actuator component 2116 can be implemented as a pinching actuator component, such as to be implemented as a robotic hand. For example, pinching actuator component 2116 can include two arms attached to a centrally disposed axle, and each arm can rotate about the axle in opposite directions, by means of one or more actuators disposed within pinching actuator component 2116, creating a pinching motion. In such an example, the pinching motion can be used to grab objects.

Figure 22:
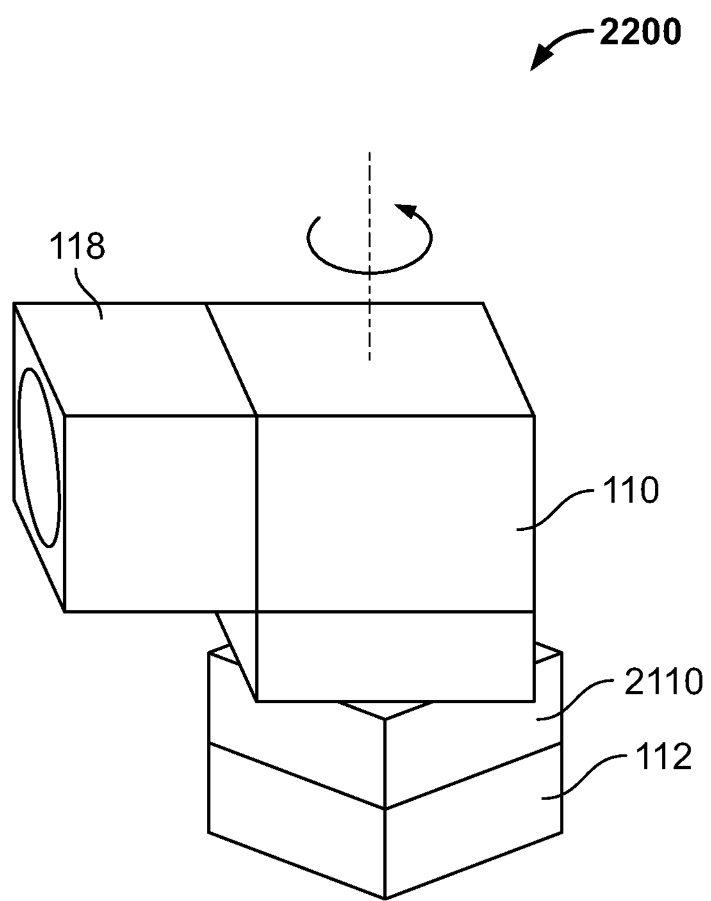
FIG. 22 shows an example of a panning modular camera system in accordance with some embodiments of the disclosed subject matter.

FIG. 22 shows an example 2200 of a panning modular camera system in accordance with some embodiments of the disclosed subject matter. As illustrated, panning modular camera 2200 can include base component 112 attached to rotary actuator component 2110, which is attached to sensor component 110, and lens component 118.

In some embodiments, rotary actuator component 2110 can rotate about a vertical axis, and thereby cause sensor component 110 and lens component 118 to rotate about the same axis. In some embodiments, rotary actuator component 2110 can rotate while sensor component 110 is capturing one or more images and/or video, in order to create a panning effect.

In some embodiments, the panning effect can be used to capture any suitable type of image. For example, it can be used to capture a panoramic image.

Figure 23:
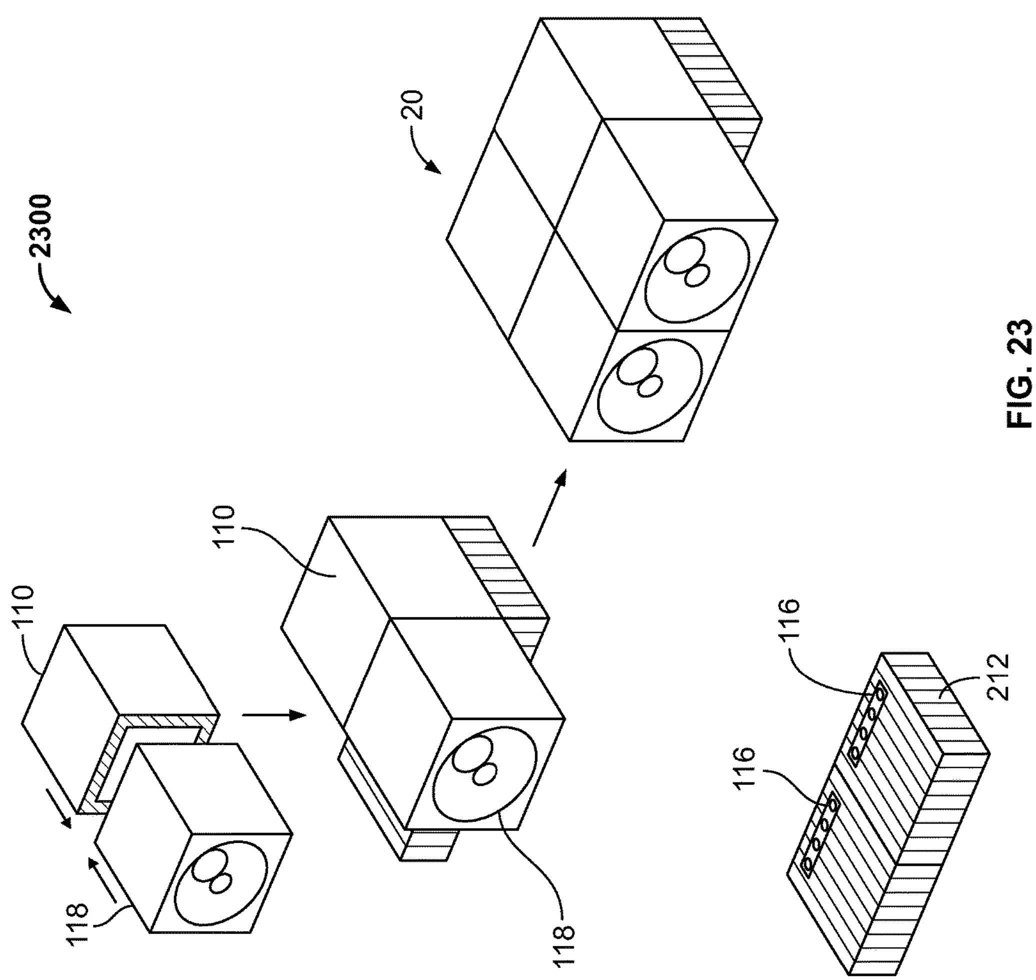
FIG. 23 shows an example of a stereo modular camera system in various states of construction in accordance with some embodiments of the disclosed subject matter.

FIG. 23 shows an example of a stereo modular camera system in various states of construction in accordance with some embodiments of the disclosed subject matter. As illustrated, configuration 2300 can include a base component 212, two sensor components 110, and two lens components 118.

In some embodiments, configuration 2300 can be used to capture two images simultaneously in order to create any suitable image or pair of images. For example, configuration 2300 can capture the two images, and transmit the two images to a user device (e.g., user device 114, as described above), which can perform stitching, stereoscopy, focal stack, collaging, and/or any other suitable image processing function.

Figure 24:
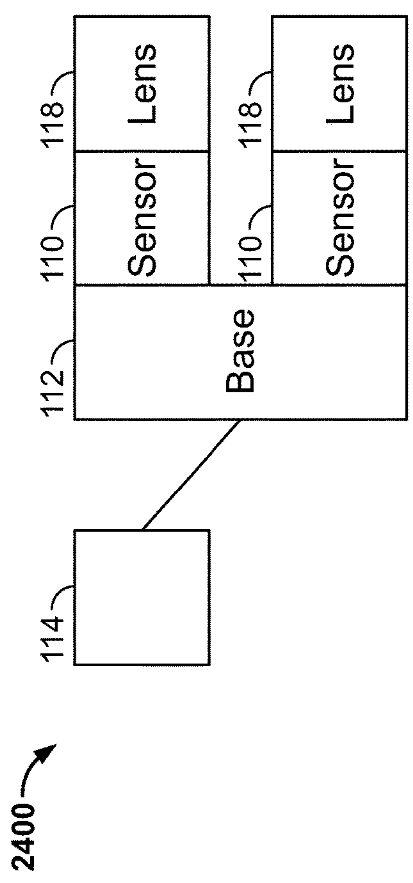
FIG. 24 shows an example of a block diagram of a stereo modular camera system in accordance with some embodiments of the disclosed subject matter.

FIG. 24 shows an example 2400 of a block diagram of a stereo modular camera system in accordance with some embodiments of the disclosed subject matter. In some embodiments, configuration 2400 can be a stereo modular camera system as described above in connection with FIG. 23.

Figure 25:
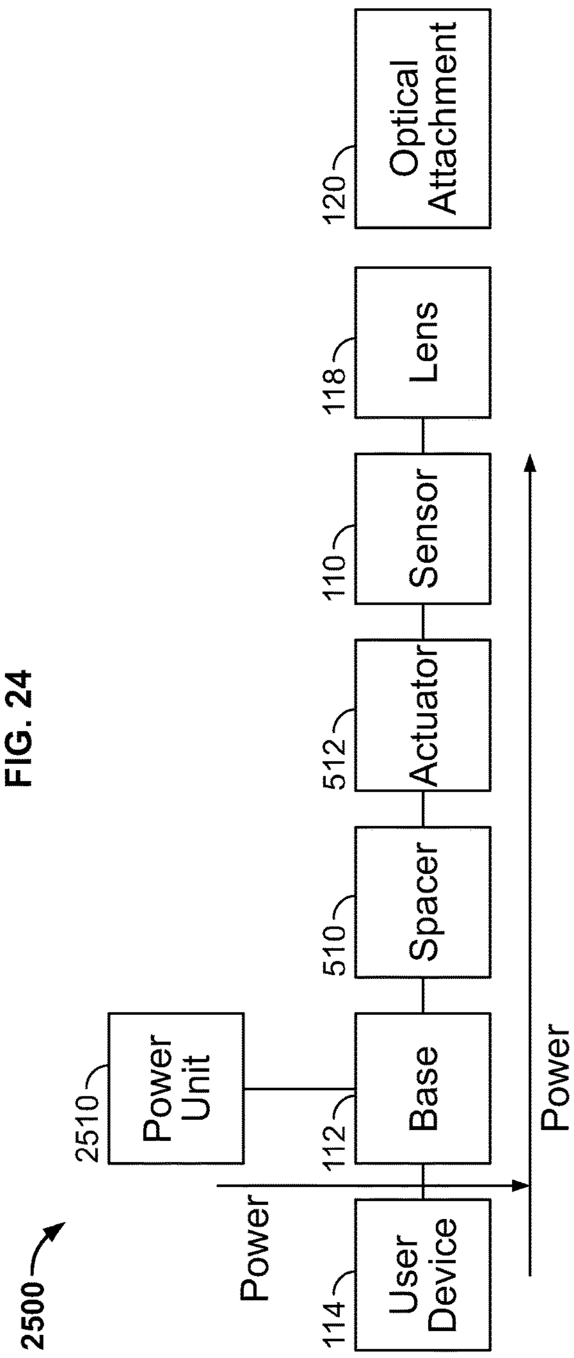
FIG. 25 shows an example of a modular camera system that includes a power modular component in accordance with some embodiments of the disclosed subject matter.

FIG. 25 shows an example 2500 of a modular camera system that includes a power modular component in accordance with some embodiments of the disclosed subject matter. As illustrated, modular camera 2500 can include a power modular component 2510, which can provide power to base component 112, spacer component 510, actuator component 512, sensor component 110, and lens component 118.

Figure 26:
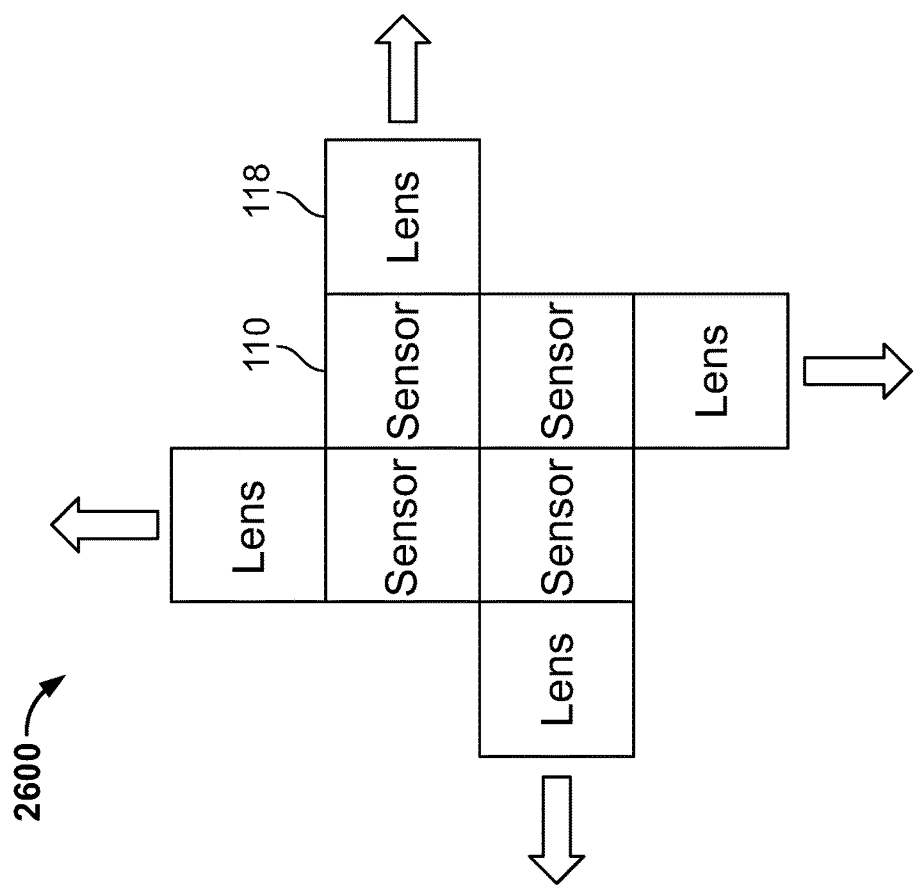
FIG. 26 shows an example of a modular camera system configured to capture four images simultaneously in accordance with some embodiments of the disclosed subject matter.

FIG. 26 shows an example 2600 of a modular camera system configured to capture four images simultaneously in accordance with some embodiments of the disclosed subject matter. As illustrated, modular camera 2600 can include four sensor components 110, and each sensor component 110 can be attached to a lens component 118.

In some embodiments, modular camera 2600 can be used to capture four images in order to create any suitable image or series of images. For example, modular camera 2600 can capture the four images, and transmit the four images to a user device (e.g., user device 114, as described above), which can perform stitching, stereoscopy, focal stack, collaging, and/or any other suitable image processing function.

Figure 27A:
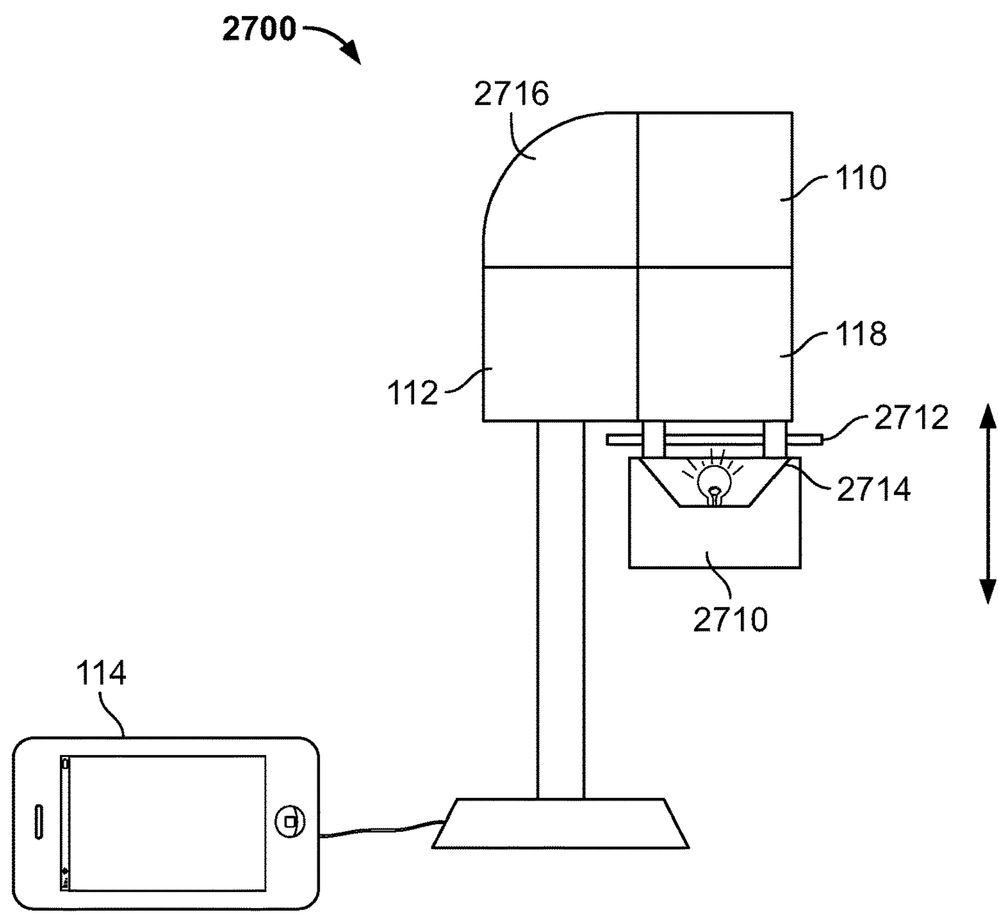
FIGS. 27A and 27B each shows an example of a modular camera system configured as a microscope in accordance with some embodiments of the disclosed subject matter.

FIG. 27A shows an example 2700 of a modular camera system configured as a microscope in accordance with some embodiments of the disclosed subject matter. As illustrated, modular camera system 2700 can include a user device 114, a right angle spacer component 2716, a base component 112, a sensor component 110, a lens component 118, and a stage component 2710, which can include a table 2712 and a light 2714.

In some embodiments, as shown in FIG. 27A, sensor component 110 can be attached to lens component 118, which can be attached to stage component 2710, such as to facilitate sensor component 110 to capture microscopic images. For example, lens component 118 can be configured with one or more lenses suitable for capturing a magnified image. Stage component 2710, which includes table 2712, can be configured such that objects placed on table 2712 are within the illuminated and magnified view of sensor component 110, thereby allowing sensor component 110 to capture a magnified image.

In some embodiments, stage component 2710 can be configured to move such that objects placed on table 2712 can move toward or away from lens component 118. For example, stage component 2710 can include an actuator attached to table 2712, and the actuator can be configured to move table 2712. Additionally or alternatively, stage component 2710 and/or table 2712 can be configured to allow a user to move them manually and/or mechanically (e.g., as described below in connection with FIG. 27B).

In some embodiments, stage component 2710, table 2712, and/or light 2714 can be implemented as part of lens component 118. For example, light 2714 can be disposed inside lens component 118 to provide internal illumination (e.g., as described below in connection with FIG. 27B).

In some embodiments, right angle spacer component 2716 can be any modular component suitable for attaching two components at a right angle. For example, right angle spacer 2716 can have connectors (e.g., magnetic connectors 116, as described above), on two of its sides, wherein the sides meet at a right angle, thereby allowing right angle spacer component 2716 to attach with two other modular components and form a right angle shape.

Figure 27B:
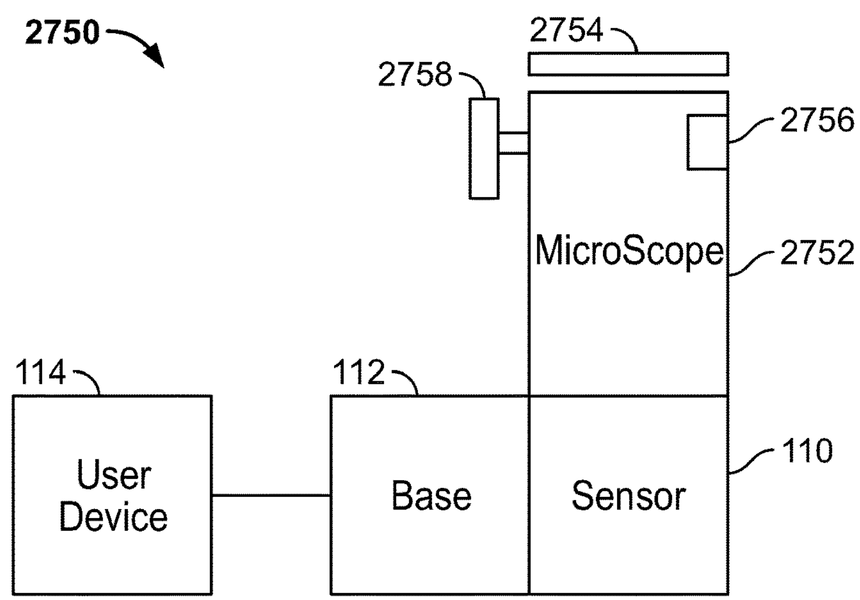

FIG. 27B shows an example 2750 of a modular camera system configured as a microscope in accordance with some embodiments of the disclosed subject matter. As illustrated, modular camera system 2750 can include user device 114, base component 112, sensor component 110, and a microscope component 2752 which can include a microscope lens (not shown), a slide 2754, a light source 2756, and a mechanical adjuster 2758.

In some embodiments, microscope component 2752 can be a modular component that can be implemented using techniques similar to the techniques described above in connection with lens component 118 of, for example, FIGS. 1, 11, and 27A.

In some embodiments, slide 2754 can be implemented using a transparent material on which a specimen can be placed. For example, slide 2754 can be implemented using glass, clear plastic, etc. In some embodiments, slide 2754 can be configured to attach to microscope component 2752 using any suitable technique or combination of techniques.

In some embodiments, as shown in FIG. 27B, slide 2754 and light source 2756 can be positioned in relation to the microscope lens of microscope component 2752 such that a specimen or specimens placed on slide 2754 are illuminated from within microscope component 2752 (and/or from outside microscope component 2752 using any suitable source of illumination other than light source 2756) and suitably magnified by the microscope lens such that sensor component 110 can capture a magnified image of the specimen or specimens.

In some embodiments, mechanical adjuster 2758 can be any suitable mechanism for facilitating adjustment of the position of slide 2754 with respect to the microscope lens and/or sensor component 110 by a user. For example, mechanical adjuster 2758 can be any suitable mechanical component such as a dial, crank, slider, lever, any other suitable mechanism, and/or any suitable combination thereof, that can move at least one side of slide 2754 with relation to microscope lens and/or sensor component 110. In a more particular example, mechanical adjuster 2758 can include a wedge (or other oblong) component on which slide 2754 rests. In such an example, turning the wedge can cause the height of slide 2754 to change by raising one side of slide 2754. Additionally or alternatively, in some embodiments, mechanical adjuster 2758 can be omitted and an electronically controlled adjuster can be used, such as an actuator to control a height of slide 2754. In such embodiments, a height of slide 2754 can be controlled using control signals originating from user device 114 and/or base component 112 to automatically bring into focus a specimen on slide 2754 and/or to manually, via signals from user device 114, control the height of slide 2754.

Figure 28:
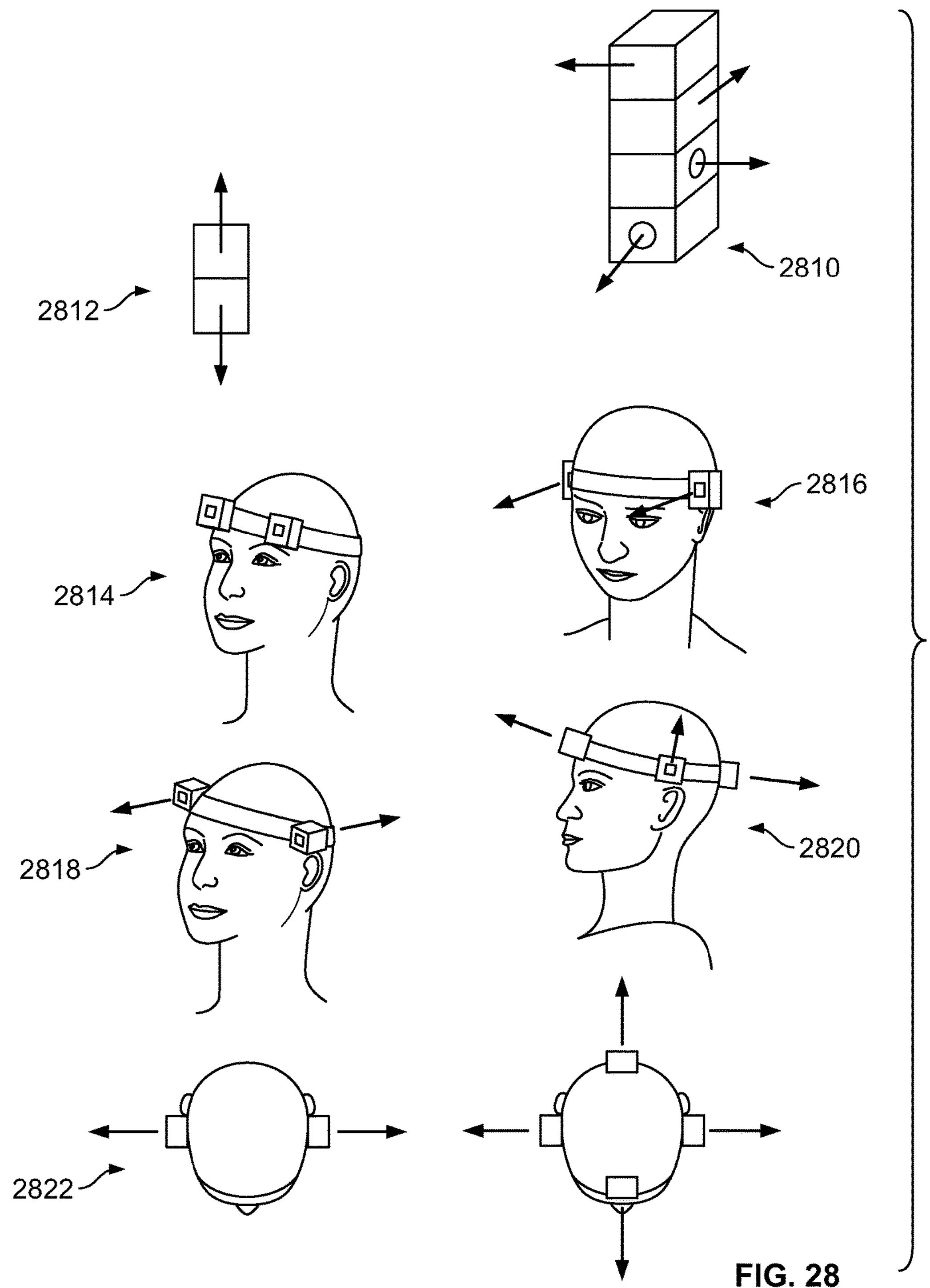
FIG. 28 shows examples of different configurations in which a modular camera system as described herein can be arranged, in accordance with some embodiments of the disclosed subject matter.

FIG. 28 shows examples of different configurations in which a modular camera system as described herein can be arranged, in accordance with some embodiments of the disclosed subject matter.

In some embodiments, example configurations 2810 and 2812 can be used to capture panoramic images. For example, configuration 2810 can use four sensor components stacked vertically upon on one another and facing in four directions to capture four images which can be used to create a panoramic image. Configuration 2812 can capture a panoramic image by using two fisheye lenses facing in opposite directions.

In some embodiments, example configurations 2814, 2816, 2818, 2820, and 2822 can be used as a wearable modular camera system. For example, as FIG. 28 shows, configurations 2814, 2816, 2818, 2820, and 2822 can include a strap configured to be worn around the head of a user. Any suitable number of sensor components can be attached to the strap, thereby allowing the user to capture images and/or video from any of the attached sensor components.

In some embodiments, the sensor components and strap can be configured such that each sensor component can couple with at least one other sensor component via electrical connections in the strap. For example, the strap can include connectors such as magnetic connectors 118, as described above, and further include electrical wires configured to pass signals between each of the connected sensor components.

Figure 29:
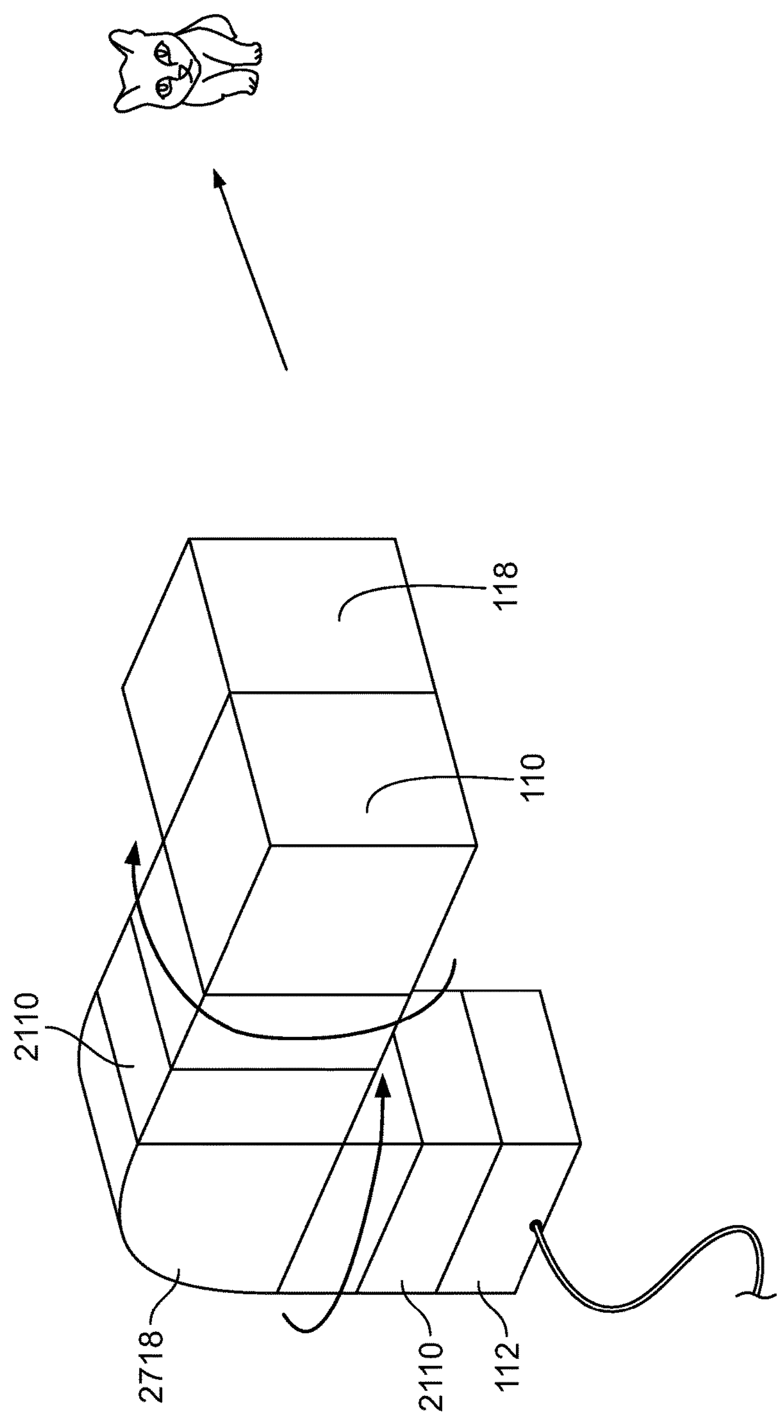
FIG. 29 shows an example of a modular camera system that can rotate about two axes in accordance with some embodiments of the disclosed subject matter.

FIG. 29 shows an example 2900 of a modular camera system that can rotate about two axes in accordance with some embodiments of the disclosed subject matter. As illustrated, configuration 2900 can include a base component 112, which can be attached to a first rotary actuator component 2110, which can be attached to right angle spacer component 2718, which can be attached to a second rotary actuator component 2110, which can be attached to sensor component 110, which can be attached to lens component 118. In some embodiments, rotary actuator components 2110 can each rotate independently, and cause the other attached modular components to rotate such that sensor component 110 can be moved into any of a wide range of positions for capturing images and/or video (e.g., acting as a pan, tilt camera).

Figure 30:
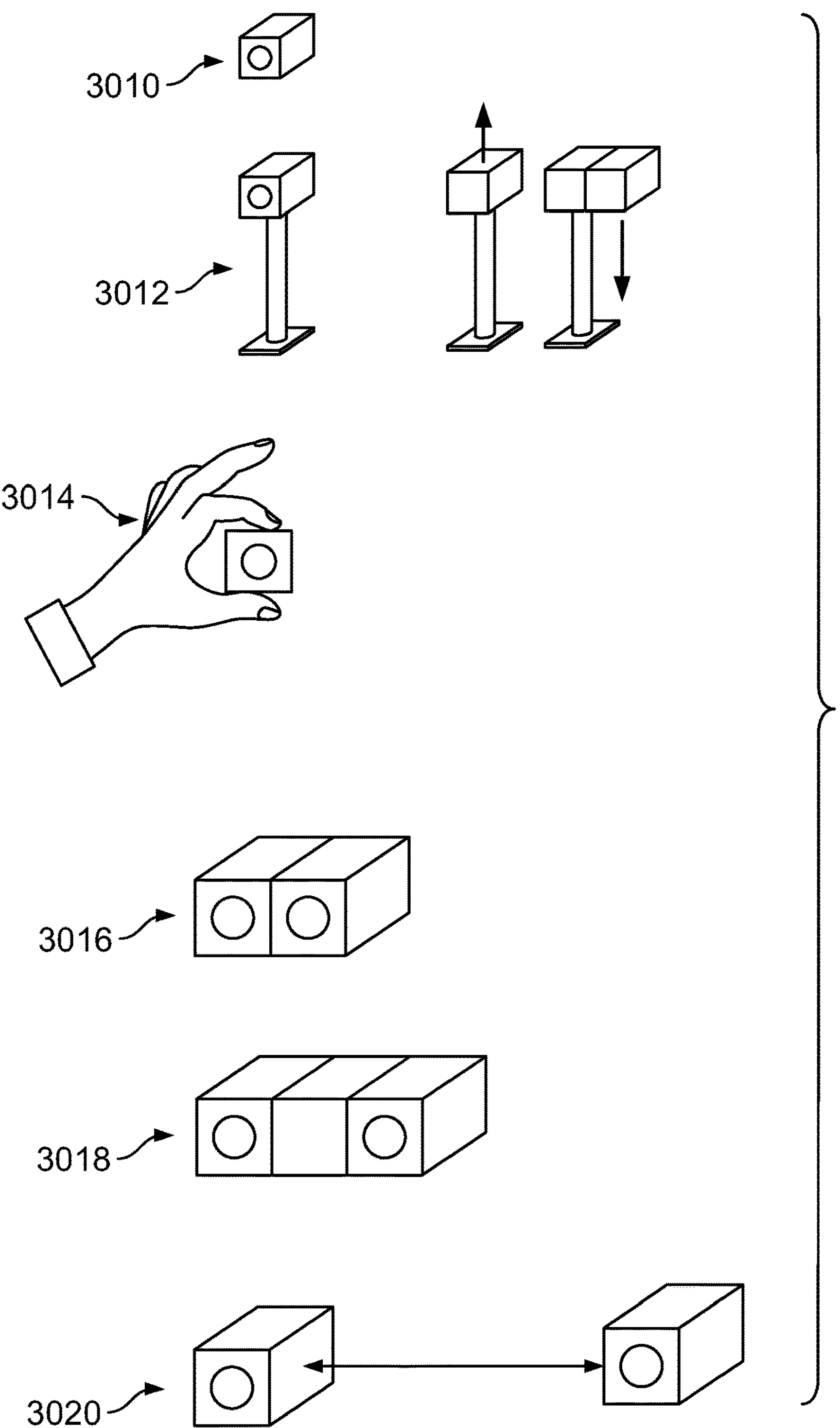
FIGS. 30 and 31 show example configurations of modular camera systems in accordance with some embodiments of the disclosed subject matter.

FIG. 30 shows example configurations 3010, 3012, 3014, 3016, 3018, and 3020, of modular camera systems in accordance with some embodiments of the disclosed subject matter. In some embodiments, configurations 3010, 3012, 3014, 3016, 3018, and 3020 can include only sensor components and/or lens components. In such embodiments, the sensor components can be operated via wireless connection with a user device (e.g., user device 114, as described above), using any suitable wireless connection (e.g., a wireless connection as described above in connection with FIG. 4).

Figure 31:
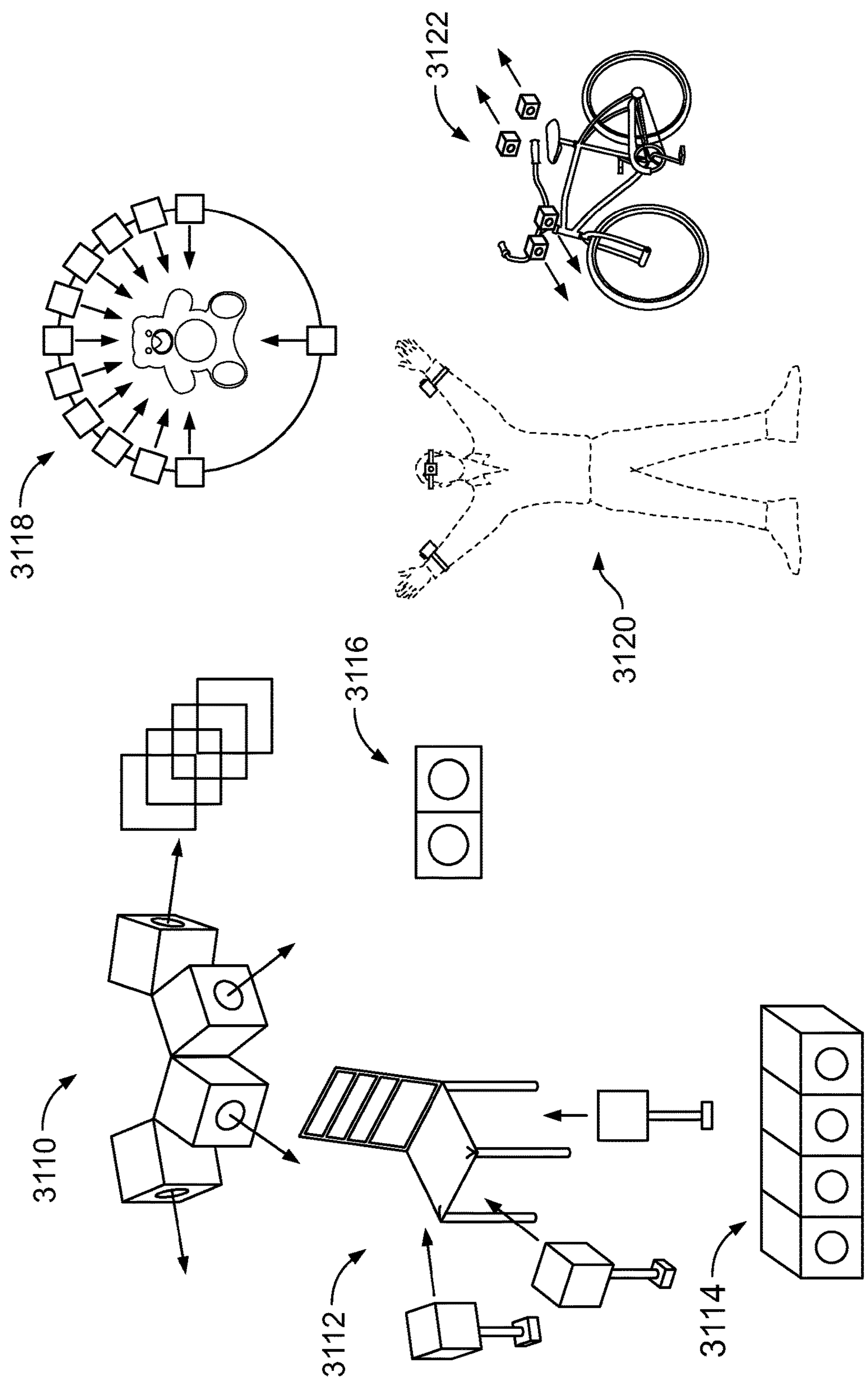

FIG. 31 shows example configurations 3110, 3112, 3114, 3116, 3118, 3120, and 3122 of modular camera systems in accordance with some embodiments of the disclosed subject matter.

In some embodiments, example configuration 3110 can include two or more sensor components configured on the same plane and facing different direction. In some embodiments, configuration 3110 can be used to capture images that can be used for a collage.

In some embodiments, example configuration 3112 can include two or more sensor components at varying heights, angles, and/or directions to capture a cubism collage.

In some embodiments, example configuration 3114 can include four sensor components configured adjacent to each other in order to capture a four image collage.

In some embodiments, example configuration 3116 can include two sensor components configured adjacent to each other, wherein one sensor component is configured with a wide angle lens and another sensor component is configured with a telephoto lens, which can be used to capture images with a varying detailed field of view.

In some embodiments, example configuration 3118 can include any suitable number of sensor components arranged circularly such as to capture images of a centrally placed object.

In some embodiments, example configuration 3120 can include sensor components attached to various parts of a human body, thus implementing a wearable modular camera system.

Figure 32:
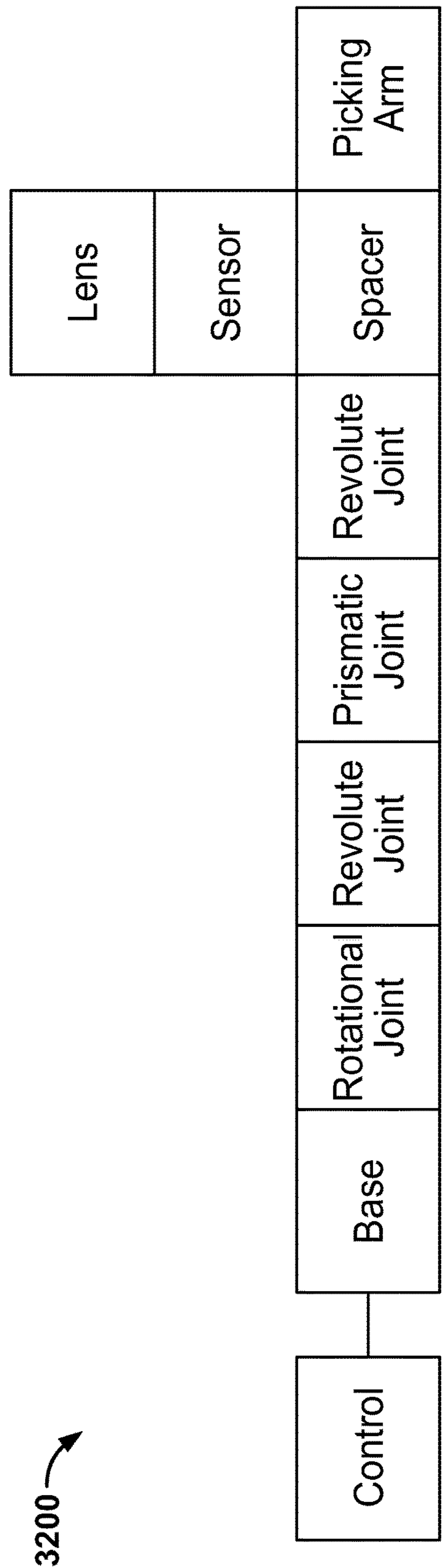
FIG. 32 shows an example of a schematic arrangement of a modular camera system implemented as a robotic arm in accordance with some embodiments of the disclosed subject matter.

In some embodiments, example configuration 3122 can include sensor components attached to a vehicle (e.g., a bicycle, as shown in FIG. 32).

FIG. 32 shows an example 3200 of a schematic arrangement of a modular camera system implemented as a robotic arm in accordance with some embodiments of the disclosed subject matter. In some embodiments, modular camera system 3200 can be implemented as a robotic arm as described below in connection with FIG. 33.

Figure 33:
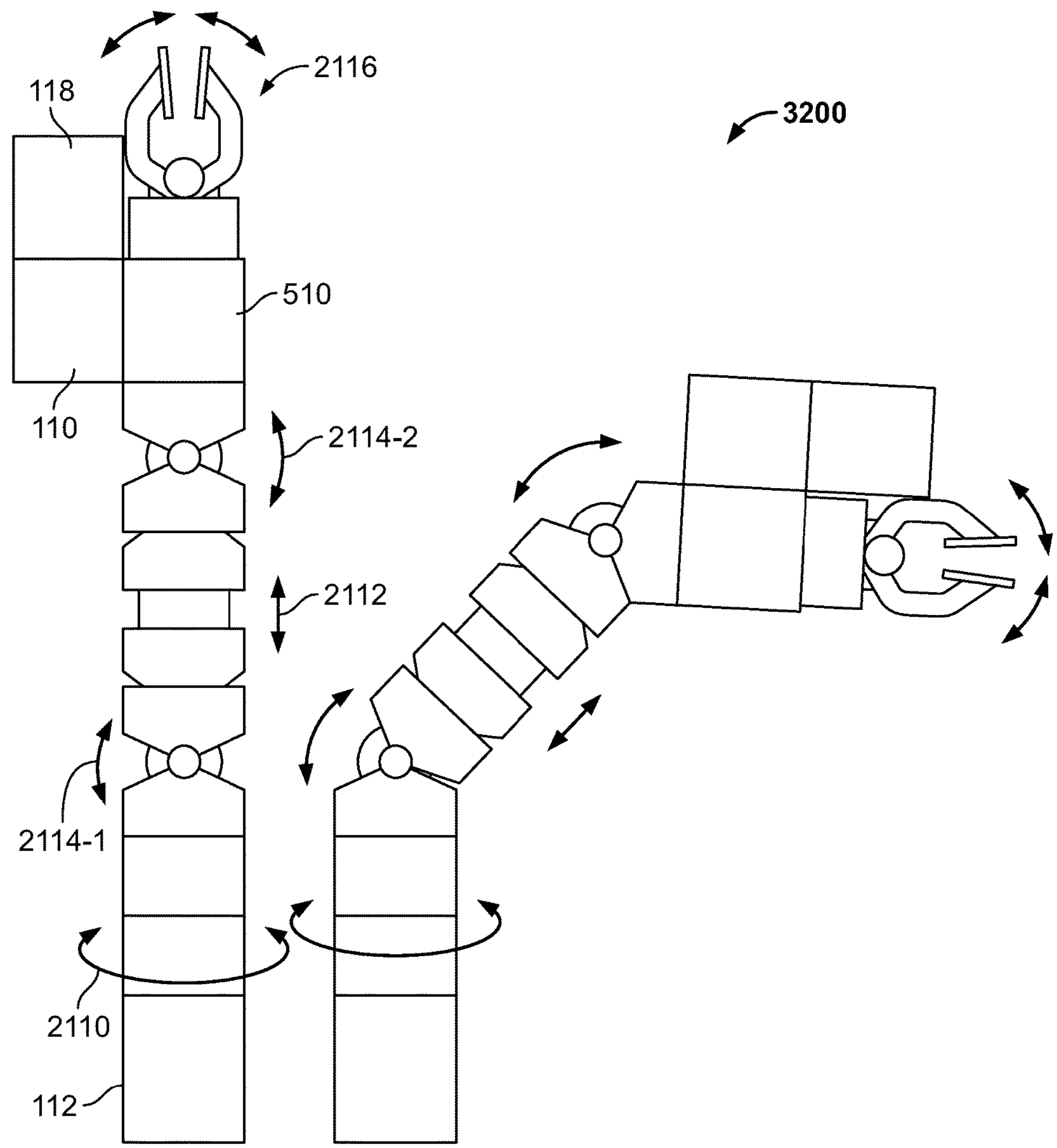
FIG. 33 shows an example of a modular camera system implemented as a robotic arm in accordance with some embodiments of the disclosed subject matter.

FIG. 33 shows an example of modular camera system 3200 implemented as a robotic arm in accordance with some embodiments of the disclosed subject matter. As illustrated, modular camera system 3200 can include base component 112, which can be attached to rotational actuator component 2110, which can be attached to a first angular actuator component 2114-1, which can be attached to expanding and/or contracting actuator component 2112, which can be attached to a second angular actuator component 2114-2, which can be attached to a spacer component 510. Spacer component 510 can further be attached to pinching actuator component 2116 and to sensor component 110, which can be attached to lens component 118.

In some embodiments, modular camera system 3200 can include any suitable combination of modular components. For example, any suitable combination and arrangement of actuator components can be used. As a more particular example, modular camera system 3200 can include pinching actuator component 2116 attached to rotary actuator component 2110, which can be attached to angular actuator component 2114.

Figure 34A:
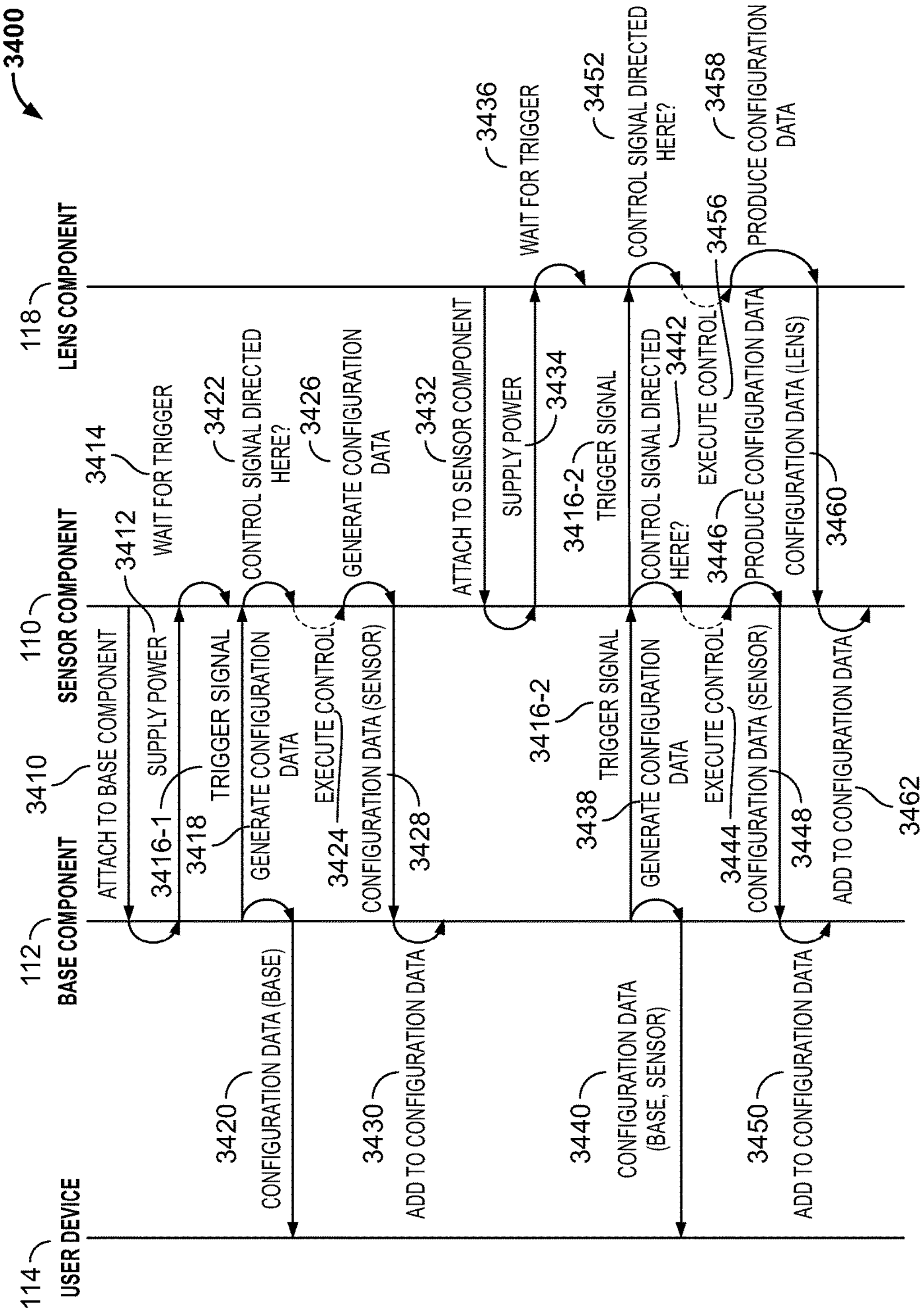
FIGS. 34A and 34B show an example of a data flow for communicating information among components of a modular camera system in accordance with some embodiments of the disclosed subject matter.
Figure 34B:
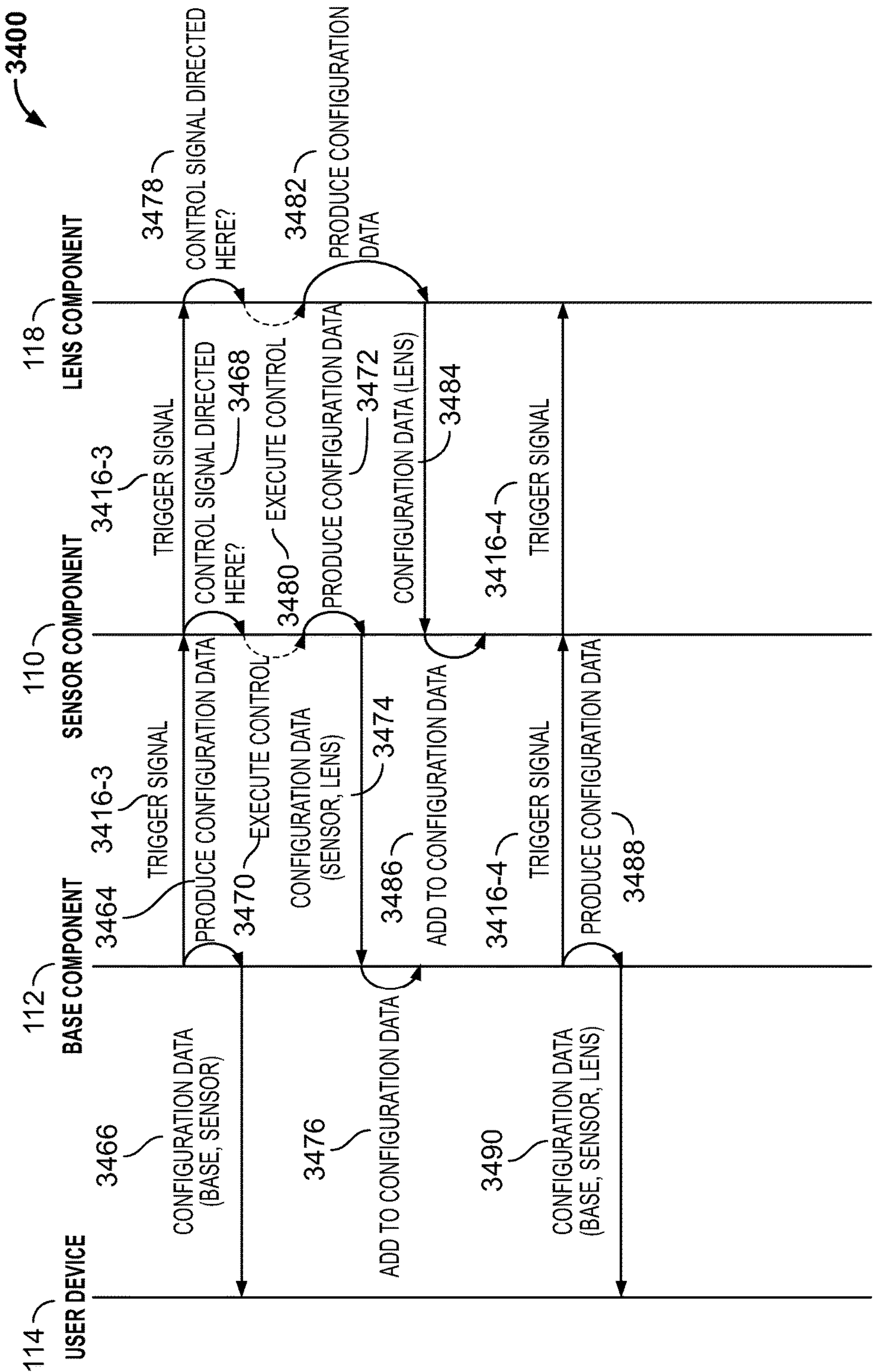

FIGS. 34A and 34B show an example 3400 of a data flow for communicating information among components of a modular camera system in accordance with some embodiments of the disclosed subject matter.

In some embodiments, at 3410 a sensor component (e.g., sensor component 110) can be electronically connected to a base component (e.g., base component 112) using any suitable connection (e.g., magnetic connector 116 as described above in connection with FIG. 1). In some embodiments, base component 112 can, in turn, be connected to a user device (e.g., user device 114). At 3412, base component 112 can supply power to sensor component 110 (e.g., through magnetic connector 116) in response to sensor component 110 being attached.

In some embodiments, at 3414, upon receiving power at 3412, sensor component 110 can wait for a trigger signal sent by base component 112 that can, for example, initiate any suitable actions by sensor component 110 (and/or any other suitable component coupled to base component 112).

At 3416-1, base component 112 can send a trigger signal to any downstream components. In some embodiments, trigger signals 3416 (i.e., trigger signals 3416-1, 3416-2, and 3416-3) can include any suitable information and/or signals. For example, trigger 3416 can be a clock signal transmitted from base component 112. As another example, trigger 3416-1 can be a particular type of control signal sent from base component 112.

In some embodiments, trigger signals 3416 can include a signal that, when received by a modular component, causes the modular component to send configuration data upstream (e.g., as described below in connection with 3418), to check for control signals sent downstream to the modular component (e.g., as described below in connection with 3422), to send control signals intended for another modular component downstream, and/or to perform any other suitable action or combination of actions.

At 3418, after sending trigger signal 3416-1, base component 112 can generate configuration data that includes configuration data received from any downstream modular component (or components) and/or information indicating an arrangement of the modular components downstream of base component 112. In some embodiments, base component 112 (and/or any other suitable modular component) can produce the configuration data using any suitable technique and/or combination of techniques. For example, the configuration data can be generated by arranging a sequence of identifiers (e.g., unique identifiers, as described above in connection with FIG. 4), the identifiers each being associated with a different modular component in the modular camera system. In such an example, the identifiers can be arranged in a sequence that reflects an arrangement of the modular components as they are physically arranged. In some embodiments, the configuration data can be generated in any suitable format, e.g., using any suitable arrangement of punctuation and/or any other suitable indication separating the identifying information corresponding to each modular component in the modular camera system. For example, base component 112 can receive configuration information from a downstream component and add that information to its own configuration information to generate configuration information for the modular camera system (e.g., as described below in connection with 3428 and 3430).

At 3420, base component 112 can communicate the configuration data generated at 3418 to user device 114, which can use the configuration data to, for example, generate a representation of the configuration of the modular camera system, determine which actions can be performed by the modular camera system, etc. As shown in FIG. 34A, because base component 112 has not yet received configuration data from sensor component 110, the configuration data sent at 3420 can include only configuration data for base component 112 itself.

Additionally, in some embodiments, after sending a trigger signal (e.g., trigger signal 3416-1), base component 112 can determine whether there is a control signal for base component 112 and/or a control signal to be sent downstream. For example, as described above in connection with FIG. 1, user device 114 can communicate control signals and/or any other suitable instructions to base component 112, which can then pass a control signal downstream, if the control signal is not directed to base component 112, so that a component to which the control signal is directed can receive the signal and take an appropriate action. In some embodiments, when a control signal and/or instruction is received from user device 114, base component 112 can store the instruction in any suitable memory to be passed on downstream at any suitable time. Additionally, in some embodiments, base component 112 can generate an appropriate control signal based on instructions received from user device 114 and store the control signal in memory to be passed downstream at any suitable time.

In some embodiments, after and/or in response to sending a trigger signal (e.g., trigger signal 3416-1), base component 112 can check to determine whether a control signal is present (e.g., in memory of base component 112) and/or whether that control signal is directed to base component 112 (e.g., as described above in connection with FIGS. 4-6), and can pass the control signal downstream if the control signal is not directed to base component 112. Otherwise, if the control signal is directed to base component 112, base component 112 perform an action based on the control signal (not shown).

At 3422, in response to receiving trigger signal 3416-1, sensor component 110 can determine whether there is a control signal for sensor component 110 and/or a control signal to be sent downstream. For example, sensor component 110 can check to determine whether a control signal is present (e.g., in memory of sensor component 110) and/or whether that control signal is directed to sensor component 110 (e.g., as described above in connection with FIGS. 4-6), and can pass the control signal downstream if the control signal is not directed to sensor component 110. Otherwise, if the control signal is directed to sensor component 110, sensor component 110 can perform an action based on the control signal at 3424 (e.g., by capturing an image in response to an instruction to capture an image). Note that, in this case, as sensor component 110 was just connected to base component 112, no control signal may be present even if such a signal was sent by user device 114 to base component 112 prior to trigger signal 3416-1 being sent. In such a case, sensor component 110 can check for a control signal, and, no control signal being present, can proceed to perform any other suitable actions (e.g., such as generating configuration information at 3426).

At 3426, sensor component 110 can generate configuration data that can be sent upstream. As described above in connection with 3418, the configuration information can be generated by combining identifying information of sensor component 110 with any other suitable identifying information received from a downstream component. For example, any configuration data received from a downstream component in a period between the most recent trigger signal and the trigger signal preceding the most recent trigger signal can be combined with the identifying information of sensor component 110. At 3428, sensor component 110 can send the configuration information generated at 3426 upstream to base component 112. Note that, in this case, the configuration data sent at 3428 can include identifying information of sensor component 110 and no other identifying information as no component is connected downstream of sensor component 110.

At 3430, base component 112 can add the configuration data sent by sensor component 110 to its own identifying information and/or can store the configuration data from sensor component 110 (e.g., in memory) to be used in generating configuration data in connection with a next trigger signal.

In some embodiments, at 3432 a lens component (e.g., lens component 118) can be electronically connected to sensor component 110 using any suitable connection (e.g., magnetic connector 116 as described above in connection with FIG. 1). At 3434, sensor component 110 can supply power to lens component 118 (e.g., through magnetic connector 116) in response to lens component 118 being attached.

In some embodiments, at 3436, upon receiving power at 3434, lens component 118 can wait for a trigger signal sent by base component 112.

At 3416-2, base component 112 can send another trigger signal to any downstream components. At 3438, after sending trigger signal 3416-2, base component 112 can generate configuration data that includes the configuration data received from sensor component 110 at 3428.

At 3440, base component 112 can communicate the configuration data generated at 3438 to user device 114, which can use the configuration data to, for example, generate a representation of the configuration of the modular camera system, determine which actions can be performed by the modular camera system, etc. As shown in FIG. 34A, because base component 112 has received configuration data from sensor component 110, the configuration data sent at 3440 can include the configuration data for base component 112 and sensor component 110.

At 3442, in response to receiving trigger signal 3416-2, sensor component 110 can determine again whether there is a control signal for sensor component 110 and/or a control signal to be sent downstream, for example, as described above in connection with 3422 and can pass on any control signal not directed to sensor component 110 and/or perform an action, at 3444, based on a control signal directed to sensor component 110.

At 3446, sensor component 110 can generate configuration data that can be sent upstream, which can include only the configuration data for sensor component itself, because, although lens component 118 has been connected to sensor component 110, configuration data has not yet been received from lens component 118.

At 3448, sensor component 110 can send the configuration data generated at 3446 upstream to base component 112. Note that, in this case, the configuration data sent at 3448 can include identifying information of sensor component 110 and no other identifying information as no component is connected downstream of sensor component 110.

At 3450, base component 112 can add the configuration data sent by sensor component 110 to its own identifying information and/or can store the configuration data from sensor component 110 in memory to be used in generating configuration data in connection with a next trigger signal.

At 3452, in response to receiving trigger signal 3416-2, lens component 110 can determine whether there is a control signal for lens component 110 and/or a control signal to be sent downstream, for example, as described above in connection with 3422 and can pass on any control signal not directed to lens component 110 and/or perform an action, at 3456, based on the a control signal is directed to lens component 110.

At 3458, lens component 118 can generate configuration data that can be sent upstream, which can include only the configuration data for lens component 118 itself because no component is presently connected downstream of lens component 118.

At 3460, lens component 118 can send the configuration data generated at 3458 upstream to sensor component 112.

At 3462, sensor component 110 can add the configuration data sent by lens component 118 to its own identifying information and/or can store the configuration data from lens component 118 in memory to be used in generating configuration data in connection with a next trigger signal.

At 3416-3, base component 112 can send another trigger signal to any downstream components. At 3464, after sending trigger signal 3416-3, base component 112 can generate configuration data that includes the configuration data received from sensor component 110 at 3448, which included only configuration data for sensor component 110.

At 3466, base component 112 can communicate the configuration data generated at 3464 to user device 114, which can use the configuration data to, for example, generate a representation of the configuration of the modular camera system, determine which actions can be performed by the modular camera system, etc. As shown in FIG. 34B, because base component 112 has received configuration data from sensor component 110, but not yet received configuration data that include lens component 118, the configuration data sent at 3466 can include the configuration data for base component 112 and sensor component 110, but not lens component 118.

At 3468, in response to receiving trigger signal 3416-3, sensor component 110 can determine again whether there is a control signal for sensor component 110 and/or a control signal to be sent downstream, for example, as described above in connection with 3422 and can pass on any control signal not directed to sensor component 110 and/or perform an action, at 3470, based on a control signal directed to sensor component 110.

At 3472, sensor component 110 can generate configuration data that can be sent upstream, which can include the configuration data for sensor component 110 itself and lens component 118 received after trigger signal 3416-2.

At 3474, sensor component 110 can send the configuration data generated at 3472 upstream to base component 112. Note that, in this case, the configuration data sent at 3474 can include identifying information of sensor component 110 and identifying information of lens component 118.

At 3476, base component 112 can add the configuration data sent by sensor component 110 (which includes configuration data corresponding to lens component 118) to its own identifying information and/or can store the configuration data from sensor component 110 in memory to be used in generating configuration data in connection with a next trigger signal.

At 3478, in response to receiving trigger signal 3416-3, lens component 118 can determine whether there is a control signal for lens component 118 and/or a control signal to be sent downstream, for example, as described above in connection with 3422 and can pass on any control signal not directed to lens component 118 and/or perform an action, at 3480, based on the a control signal is directed to lens component 118.

At 3482, lens component 118 can generate configuration data that can be sent upstream, which can include only the configuration data for lens component 118 itself because no component is presently connected downstream of lens component 118.

At 3484, lens component 118 can send the configuration data generated at 3482 upstream to sensor component 112.

At 3486, sensor component 110 can add the configuration data sent by lens component 118 to its own identifying information and/or can store the configuration data from lens component 118 in memory to be used in generating configuration data in connection with a next trigger signal.

At 3416-4, base component 112 can send another trigger signal to any downstream components. At 3488, after sending trigger signal 3416-4, base component 112 can generate configuration data that includes the configuration data received from sensor component 110 at 3474, which included configuration data for sensor component 110 and configuration data for lens component 118.

At 3490, base component 112 can communicate the configuration data generated at 3488 to user device 114, which can use the configuration data to, for example, generate a representation of the configuration of the modular camera system, determine which actions can be performed by the modular camera system, etc. As shown in FIG. 34B, because base component 112 has received configuration data from sensor component 110 that includes configuration data for lens component 118, the configuration data sent at 3490 can include the configuration data for base component 112 and sensor component 110 and lens component 118.

In some embodiments, data flow 3400 can continue to perform similar actions for any suitable components that are attached and/or detached from the modular camera system. In some embodiments, if a component is detached, the configuration data from that component is not received upstream, and accordingly, is not included in configuration data sent upstream toward base component 112 and user device 114. For example, if lens component 118 is disconnected from sensor component 110, after a next trigger signal is received, the configuration data generated by sensor component 110 may not include configuration information for lens component 118. This configuration data that does not include lens component 118 will then be communicated to user device 114 via base component 112, and the representation of the modular camera system generated by user device 114 can be updated to reflect the fact that lens component 118 has been removed.

Although data flow 3400 is illustrated using user device 114, base component 112, sensor component 110, and lens component 118, the techniques described in connection with data flow 3400 can be used in connection with any suitable number and combination of modular components. For example, a spacer component (e.g., spacer component 518, as described above in connection with FIGS. 5 and 14), an actuator component (e.g., actuator component 512, as described above in connection with FIGS. 5 and 12), additional sensor components, additional lens components, any other suitable modular component or components, and/or any suitable combination thereof can be combined to create different modular camera systems, and control signals and configuration information can be communicated among the various modular components using similar techniques to those described in connection with data flow 3400.

In some embodiments of the disclosed subject matter, the above described steps of the process of FIG. 34 can be executed or performed in any order or sequence not limited to the order and sequence shown and described in the figures. Also, some of the above steps of the process of FIG. 34 can be executed or performed substantially simultaneously where appropriate or in parallel to reduce latency and processing times. Furthermore, it should be noted that FIG. 34 is provided as an example only. At least some of the steps shown may be performed in a different order than represented, performed concurrently, or omitted.

Figure 35:
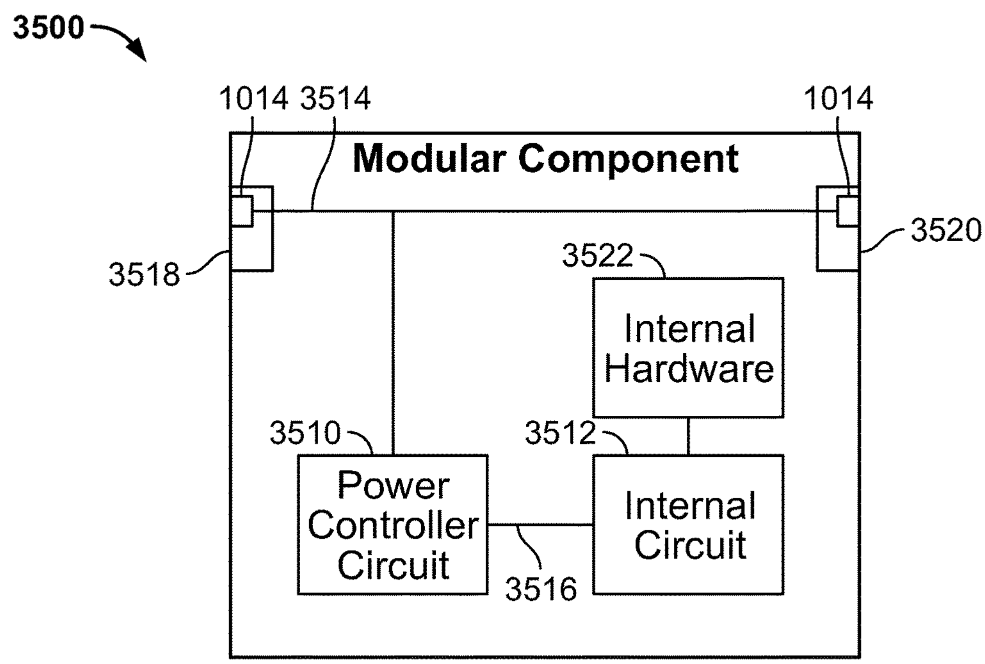
FIG. 35 shows an example of a power system for a modular component in accordance with some embodiments of the disclosed subject matter.

FIG. 35 shows an example 3500 of a power system for a modular component in accordance with some embodiments of the disclosed subject matter. As illustrated, power system 3500 can include a power controller circuit 3510, an internal circuit 3512, a power supply connection 3514, a regulated power connection 3516, an upstream connector 3518, a downstream connector 3520, internal hardware 3522, and power contacts 1014 (as described above in connection with FIG. 10).

In some embodiments, upstream connector 3518 and downstream connector 3520 can be implemented as any connector suitable for establishing an electrical and/or mechanical connection between modular components. For example, connectors 3518 and 3520 can be implemented as magnetic connectors 116 (as described above in connection with FIGS. 1, 9, and 10), and/or connectors 418 and/or 420 (as described above in connection with FIG. 4). In some embodiments, connectors 3518 and 3520 can each include a power contact 1014.

In some embodiments, upstream connector 3518 can be coupled with power controller circuit 3510 and downstream controller 3520 via power supply connection 3514 such that when upstream connector 3518 is coupled with a corresponding connector of a different modular component, having a corresponding power contact 1014, power can be transmitted to power controller circuit 3510 and downstream connector 3520 via power supply connection 3514.

In some embodiments, internal circuit 3512 can be any circuitry included in a modular component. For example, internal circuit 3512 can include a hardware processor (e.g., hardware processor 410, as described above in connection with FIG. 4), an image sensor (e.g., image sensor 814, as described above in connection with FIG. 8), a signal interface (e.g., control signal interface 808, as described above in connection with FIG. 8), any other suitable internal circuitry, and/or any suitable combination thereof. Similarly, in some embodiments, internal hardware 3522 can be any hardware included in a modular component. For example, internal hardware 3522 can be an actuator (e.g., actuator 1214, as described above in connection with FIG. 12), a light (e.g., light 1510, as described above in connection with FIG. 15), any other suitable hardware, and/or any suitable combination thereof.

In some embodiments, power controller circuit 3510 can be any circuit suitable for regulating the power received by internal circuit 3512 and/or internal hardware 3522 (e.g., a power controller circuit as described below in connection with FIG. 36). For example, power controller circuit 3510 can be a circuit configured to regulate an incoming current and/or voltage level upon initial connection with a power source (sometimes referred to herein as inrush current) and/or after the initial connection (sometimes referred to herein as normal operating current) and output a regulated current to internal circuit 3512 and/or internal hardware 3522 via regulated power connection 3516. As a more particular example, power controller circuit 3510 can be a circuit configured to prevent an inrush current from causing damage to internal circuit 3512 and/or internal hardware 3522 by preventing internal circuit 3512 and/or internal hardware 3522 from receiving current that is higher than a predetermined amperage (e.g., via a hot-swap circuit, as described below in connection with FIG. 36) when a modular component that includes power controller circuit 3510 is initially connected to a different modular component and thereby begins receiving power. Additionally or alternatively, in some embodiments, power controller 3510 can be a circuit configured to prevent an inrush current from causing a drop in voltage at other modular components that would render the other modular component inoperable by maintaining a steady or nearly steady input voltage at internal circuit 3512 and/or internal hardware 3522 (e.g., via a linear regulator, as described below in connection with FIG. 36). Note that although regulated power connection 3516 is shown as coupling power controller circuit 3510 with internal hardware 3522 via internal circuit 3512, in some embodiments, power controller circuit 3510 can be coupled directly to internal hardware 3522 via regulated power connection 3516.

Figure 36:
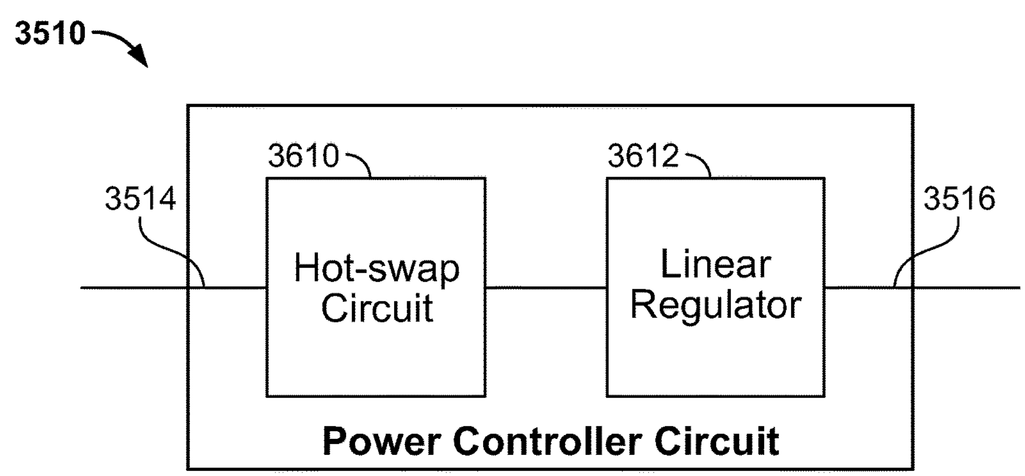
FIG. 36 shows an example of hardware that can be used to implement a power controller circuit in accordance with some embodiments of the disclosed subject matter.

FIG. 36 shows an example of hardware that can be used to implement power controller circuit 3510 in accordance with some embodiments of the disclosed subject matter. As illustrated, power controller circuit 3510 can include power supply connection 3514 that is connected to a hot-swap circuit 3610, which in turn is electrically connected to a linear regulator 3612, which in turn is electrically connected with regulated power connection 3516.

In some embodiments, power controller circuit 3510 can be included in one or more modular components of a modular camera system to regulate the power received by the one or more modular components, as described above in connection with FIG. 35.

In some embodiments, hot-swap circuit 3610 can be implemented using any suitable circuit for regulating an inrush current and/or a normal operating current. For example, hot-swap circuit 3610 can be a circuit configured to cap an inrush current (e.g., an inrush current originating from power supply connection 3514) at a first predetermined level, and cap the normal operating current at a second predetermined level. As another example, hot-swap circuit 3610 can be a circuit configured to cap an inrush current at a first predetermined level, and gradually increase the cap to a second predetermined level. In some embodiments, hot-swap circuit 3610 can be a circuit that is also configured to prevent short circuits and overcurrent faults. For example, hot-swap circuit 3610 can be implemented using an LTC4210 Hot Swap Controller, available from Linear Technology of Milpitas, Calif., USA.

In some embodiments, linear regulator 3612 can be any circuit suitable for maintaining a constant or nearly constant output voltage. For example, linear regulator 3612 can be a circuit that includes a variable resistor configured to alter resistance in order to maintain a predetermined constant output voltage associated with regulated power connection 3516. In some embodiments, linear regulator 3612 can be implemented as an integrated circuit that includes hot-swap circuit 3610.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, systems, methods and media for providing modular cameras are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow. Features of the disclosed embodiments can be combined and rearranged in various ways.

What is claimed is:

1. A modular imaging device, comprising:

a base module comprising:
- a user device interface disposed on a first side of the base module, the user device interface configured to receive signals from a user device;
- a first magnet disposed proximate to a surface of a second side of the base module;
- a first plurality of electrical contacts disposed on the second side of the base module; and
- one or more circuits that are configured to:
  - receive information transmitted to the base module from the user device via the user device interface;
  - transmit one or more control signals based on the information received from the user device to control one or more modules coupled to the base module via at least a first electrical contact of the first plurality of electrical contacts; and
  - receive image data via at least a second electrical contact of the first plurality of electrical contacts; and
  - transmit the received image data to the user device via the user device interface; and an image sensor module comprising:
- a second plurality of electrical contacts disposed on a first side of the image sensor module, wherein each electrical contact of the second plurality of electrical contacts is arranged such that it contacts a corresponding electrical contact of the first plurality of electrical contacts when the first side of the image sensor module and the second side of the base module are in contact with one another in a particular orientation;
- a second magnet disposed proximate to a surface of the first side of the image sensor module, wherein the second magnet is arranged such that when the first side of the image sensor module is brought into proximity of the second side of the base module in the particular orientation the second magnet is attracted to the first magnet;
- a third plurality of electrical contacts disposed on a second side of the image sensor module;
- an image sensor; and
- one or more circuits that are configured to:
  - receive a first control signal via at least a first electrical contact of the second plurality of electrical contacts, wherein the first control signal is a signal indicating that the image sensor is to capture image data;
  - determine that the first control signal is a control signal for the image sensor module and that the first control signal indicates that the image sensor is to capture image data;

in response to the first control signal, cause the image sensor to capture image data;

transmit the captured image data using at least a second electrical contact of the second plurality of electrical contacts that corresponds to the second electrical contact of the first plurality of electrical contacts;

receive a second control signal via at least the first electrical contact of the second plurality of electrical contacts, wherein the second control signal indicates that it is for a module other than the image sensor module; and transmit the second control signal via at least a first electrical contact of the third plurality of electrical contacts.

2. The modular imaging device of claim 1, wherein the image sensor module further comprises a third magnet disposed proximate to a surface of the second side of the image sensor module, the modular imaging device further comprising:

a lens module comprising:

a fourth plurality of electrical contacts disposed on a first side of the lens module, wherein each electrical contact of the fourth plurality of electrical contacts is arranged such that it contacts a corresponding contact of the third plurality of electrical contacts when the first side of the lens module and the second side of the image sensor module are in contact with one another in a particular orientation;

a fourth magnet disposed proximate to a surface of the first side of the lens module, wherein the fourth magnet is arranged such that when the first side of the lens module is brought into proximity of the second side of the image sensor module in the particular orientation the fourth magnet is attracted to the third magnet;

a lens;

one or more circuits that are configured to:

transmit information identifying the type of lens included in the lens module using at least a first electrical contact of the fourth plurality of electrical contacts that corresponds to the first electrical contact of the third plurality of electrical contacts; and wherein the one or more circuits of the sensor module are further configured to:

receive the information identifying the type of lens included in the lens module using at least the first electrical contact of the third plurality of electrical contacts; and transmit the information identifying the type of lens included in the lens module using at least the first electrical contact of the second plurality of electrical contacts.

3. The modular imaging device of claim 2, further comprising:

a second lens module that can be used interchangeably with the lens module, the second lens module comprising:

a fifth plurality of electrical contacts disposed on a first side of the second lens module, wherein each electrical contact of the fifth plurality of electrical contacts is arranged such that it contacts a corresponding contact of the third plurality of electrical contacts when the first side of the second lens module and the second side of the image sensor module are in contact with one another in a particular orientation;

a fifth magnet disposed proximate to a surface of the first side of the second lens module, wherein the fifth magnet is arranged such that when the first side of the second lens module is brought into proximity of the second side of the image sensor module in the particular orientation the fifth magnet is attracted to the third magnet;

a second lens;

an actuator;

one or more circuits that are configured to:

receive the second control signal via at least the first electrical contact of the fifth plurality of electrical contacts, wherein the second control signal is a signal indicating that the second lens module is to move the second lens using the actuator;

determine that the second control signal is a control signal for the second lens module and that the second control signal indicates that the actuator is to be driven to move the second lens; and in response to the second control signal, cause the actuator to be activated based on the second control signal.

4. The modular imaging device of claim 2, wherein the lens module further comprises a sixth magnet disposed proximate to a surface of a second side of the lens module, the modular imaging device further comprising:

an optical component comprising:

a seventh magnet disposed proximate to a surface of a first side of the optical component, wherein the seventh magnet is arranged such that when the first side of the optical component is brought into proximity of the second side of the lens module in a particular orientation the seventh magnet is attracted to the sixth magnet; and an optical filter through which light from a scene passes such that when the first side of the optical component is in contact with the second side of the lens module in the particular orientation, the light passing through the optical filter is received by the lens of the lens module.

5. The modular imaging device of claim 1, further comprising a rotational actuator module comprising:

a sixth plurality of electrical contacts disposed on a first side of the rotational actuator module, wherein each electrical contact of the sixth plurality of electrical contacts is arranged such that it contacts a corresponding contact of the first plurality of electrical contacts when the first side of the rotational actuator module and the second side of the base module are in contact with one another in a particular orientation;

an eighth magnet disposed proximate to a surface of the first side of the rotational actuator module, wherein the sixth magnet is arranged such that when the first side of the rotational actuator module is brought into proximity of the second side of the base module in the particular orientation the eighth magnet is attracted to the first magnet;

a seventh plurality of electrical contacts disposed on a second side of the rotational actuator module, wherein each electrical contact of the seventh plurality of electrical contacts is arranged such that it contacts a corresponding contact of the second plurality of electrical contacts when the second side of the rotational actuator module and the first side of the image sensor module are in contact with one another in a particular orientation;

a ninth magnet disposed proximate to a surface of the second side of the rotational actuator module, wherein the seventh magnet is arranged such that when the second side of the rotational actuator module is brought into proximity of the first side of the image sensor module in the particular orientation the ninth magnet is attracted to the second magnet;

a first housing including the first side of the rotational actuator module;

a second housing including the second side of the rotational actuator module;

a rotational actuator configured to rotate the second housing with respect to the first housing based on a control signal; and one or more circuits that are configured to:

receive the second control signal via at least the first electrical contact of the sixth plurality of electrical contacts, wherein the second control signal indicates that it is for a module other than the rotational actuator module;

transmit the second control signal via at least a first electrical contact of the seventh plurality of electrical contacts;

receive a third control signal via at least the first electrical contact of the sixth plurality of electrical contacts, wherein the third control signal is a signal indicating that the second housing is to be rotated relative to the first housing using the rotational actuator;

determine that the third control signal is a control signal for the rotational actuator module and that the third control signal indicates that the second housing is to be rotated relative to the first housing using the rotational actuator; and in response to the third control signal, cause the rotational actuator to be activated based on the third control signal.

6. The modular imaging device of claim 1, wherein the image sensor module further comprises an eighth plurality of electrical contacts disposed on a third side of the image sensor module and a tenth magnet disposed proximate to the third side of the image sensor module, the modular imaging device further comprising:

a strobe module comprising:

a ninth plurality of electrical contacts disposed on a first side of the strobe module, wherein each electrical contact of the ninth plurality of electrical contacts is arranged such that it contacts a corresponding contact of the eighth plurality of electrical contacts when the first side of the strobe module and the third side of the image sensor module are in contact with one another in a particular orientation;

an eleventh magnet disposed proximate to a surface of the first side of the strobe module, wherein the ninth magnet is arranged such that when the first side of the strobe module is brought into proximity of the third side of the image sensor module in the particular orientation the eleventh magnet is attracted to the ninth magnet;

at least one light source; and one or more circuits that are configured to:

receive a fourth control signal via at least the first electrical contact of the ninth plurality of electrical contacts, wherein the fourth control signal is a signal indicating that the strobe module is to activate the at least one light source;

determine that the fourth control signal is a control signal for the strobe module and that the fourth control signal indicates that the at least one light source is to be activated; and in response to the fourth control signal, activate the light source.

7. The modular imaging device of claim 1, wherein the base module receives power from the user device via a voltage received on the user device interface and supplies the received voltage using a third electrical contact of the first plurality of electrical contacts.

8. The modular imaging device of claim 1, wherein the base module further comprises a tenth plurality of electrical contacts disposed on a third side of the base module and a twelfth magnet disposed proximate to the third side of the base module, the modular imaging device further comprising:

a power module comprising:

a least one electrical contacts disposed on a first side of the power module, wherein the at least one electrical contact of the eleventh plurality of electrical contacts is arranged such that it contacts a corresponding contact of the tenth plurality of electrical contacts when the first side of the power module and the third side of the base module are in contact with one another in a particular orientation;

a thirteenth magnet disposed proximate to a surface of the first side of the power module, wherein the thirteenth magnet is arranged such that when the first side of the power module is brought into proximity of the third side of the base module in the particular orientation the thirteenth magnet is attracted to the twelfth magnet; and at least one power source, wherein the power module is configured to supply a voltage to the at least one electrical contact to provide power to the base module.

9. The modular imaging device of claim 1, wherein the one or more circuits of the image sensor are further configured to process the captured image data prior to transmitting the captured image data using at least the second electrical contact of the second plurality of electrical contacts.

10. The modular imaging device of claim 1, wherein the base module further comprises:

a fourteenth magnet disposed proximate to a surface of the second side of the base module;

an eleventh plurality of electrical contacts disposed on the second side of the base module; and wherein the one or more circuits of the base module are further configured to:

transmit the one or more control signals based on the information received from the user device to control one or more modules coupled to the base module via at least a first electrical contact of the eleventh plurality of electrical contacts; and receive second image data via at least a second electrical contact of the eleventh plurality of electrical contacts; and transmit the received second image data to the user device via the user device interface; and wherein the module imaging device further comprises:

a second image sensor module comprising:

a twelfth plurality of electrical contacts disposed on a first side of the second image sensor module, wherein each electrical contact of the twelfth plurality of electrical contacts is arranged such that it contacts a corresponding electrical contact of the eleventh plurality of electrical contacts when the first side of the second image sensor module and the second side of the base module are in contact with one another in a particular orientation;

a fifteenth magnet disposed proximate to a surface of the first side of the image sensor module, wherein the second magnet is arranged such that when the first side of the image sensor module is brought into proximity of the second side of the base module in the particular orientation the second magnet is attracted to the first magnet;

a second image sensor; and one or more circuits that are configured to:

receive a fifth control signal via at least a first electrical contact of the twelfth plurality of electrical contacts, wherein the first control signal is a signal indicating that the second image sensor is to capture image data;

determine that the fifth control signal is a control signal for the second image sensor module and that the fifth control signal indicates that the image sensor is to capture image data;

in response to the fifth control signal, cause the second image sensor to capture second image data; and transmit the captured second image data using at least a second electrical contact of the twelfth plurality of electrical contacts that corresponds to the second electrical contact of the eleventh plurality of electrical contacts.

11. The modular imaging device of claim 1, wherein the one or more circuits of the image sensor module are further configured to:

transmit identifying information of the image sensor module using the first electrical contact of the second plurality of electrical contacts;

receive identifying information of a module connected to the second side of the image sensor module using the first electrical contact of the third plurality of electrical contacts; and transmit the identifying information of the module connected to the second side of the image sensor with information indicating that the module is connected to the second side of the image sensor using the first electrical contact of the second plurality of electrical contacts.

12. The modular imaging device of claim 1, wherein the one or more circuits of the base module include a hardware processor and a hub, wherein the hardware processor transmits the control signals, and wherein the hub receives the image data and transmits the received image data to the user device via the user device interface.

13. The modular imaging device of claim 1, wherein the one or more circuits of the image sensor module include a hardware processor.

14. The modular imaging device of claim 1, wherein the user device interface comprises a universal serial bus (USB) interface.

15. The modular imaging device of claim 1, wherein the first plurality of electrical contacts each comprise a pin that is biased toward the outside of the base module by a spring.

16. The modular imaging device of claim 15, wherein the second plurality of electrical contacts each comprise a contact pad disposed within a body of the image sensor module.

* * * * *